(12) United States Patent
Ogawara

(10) Patent No.: US 9,357,479 B2
(45) Date of Patent: May 31, 2016

(54) COMMUNICATION SYSTEM, COMMUNICATION CONTROL SYSTEM, COMMUNICATION APPARATUS, COMMUNICATION METHOD, AND CONNECTION PROGRAM

(71) Applicant: Osamu Ogawara, Kanagawa (JP)

(72) Inventor: Osamu Ogawara, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/475,686

(22) Filed: Sep. 3, 2014

(65) Prior Publication Data
US 2015/0072680 A1    Mar. 12, 2015

(30) Foreign Application Priority Data

Sep. 10, 2013  (JP) .................................. 2013-187001
Jun. 2, 2014   (JP) .................................. 2014-114310

(51) Int. Cl.
*H04W 4/00*   (2009.01)
*H04W 48/16*  (2009.01)

(52) U.S. Cl.
CPC .............. *H04W 48/16* (2013.01); *H04W 4/003* (2013.01)

(58) Field of Classification Search
None
See application file for complete search history.

(56) References Cited

U.S. PATENT DOCUMENTS

| 8,767,573 | B2 | 7/2014 | Goto | |
|---|---|---|---|---|
| 2003/0179734 | A1* | 9/2003 | Tsutsumi et al. | ............. 370/338 |
| 2011/0222518 | A1 | 9/2011 | Ota et al. | |
| 2011/0249198 | A1* | 10/2011 | D'Alessio | ................ H04N 5/74 348/744 |
| 2013/0057591 | A1 | 3/2013 | Sugiyama | |
| 2013/0176956 | A1 | 7/2013 | Yamamoto | |

FOREIGN PATENT DOCUMENTS

| JP | 2006-074295 | 3/2006 |
|---|---|---|
| JP | 2006-254301 | 9/2006 |
| JP | 2010-087801 | 4/2010 |
| JP | 2011-188236 | 9/2011 |
| JP | 2012-093895 | 5/2012 |
| JP | 2013-066175 | 4/2013 |
| JP | 2013-143616 | 7/2013 |

OTHER PUBLICATIONS

Japanese Office Action dated Jul. 29, 2014.

* cited by examiner

*Primary Examiner* — Suhail Khan
(74) *Attorney, Agent, or Firm* — Harness, Dickey & Pierce, P.L.C.

(57) ABSTRACT

A communication system having a first communication apparatus and a second communication apparatus is disclosed. The first communication apparatus includes a transmission unit which transmits a signal including at least a network identifier, and wherein the second communication apparatus includes a selection unit which selects a network identifier included in a signal received; and a control unit which connects to a network of the network identifier selected when predetermined information is included in a predetermined location in the network identifier selected and which outputs an alarm when the predetermined information is not included in the predetermined location in the network identifier selected.

9 Claims, 17 Drawing Sheets

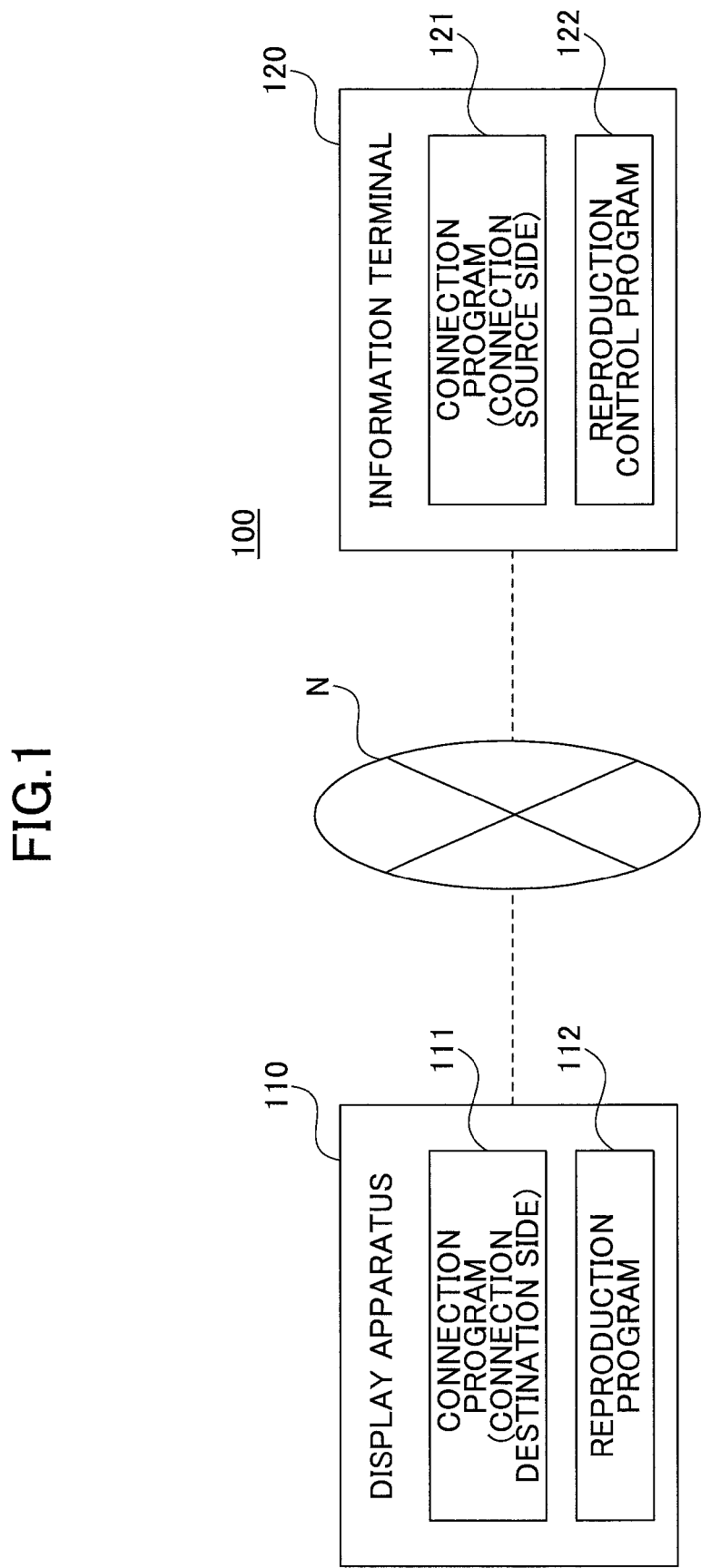

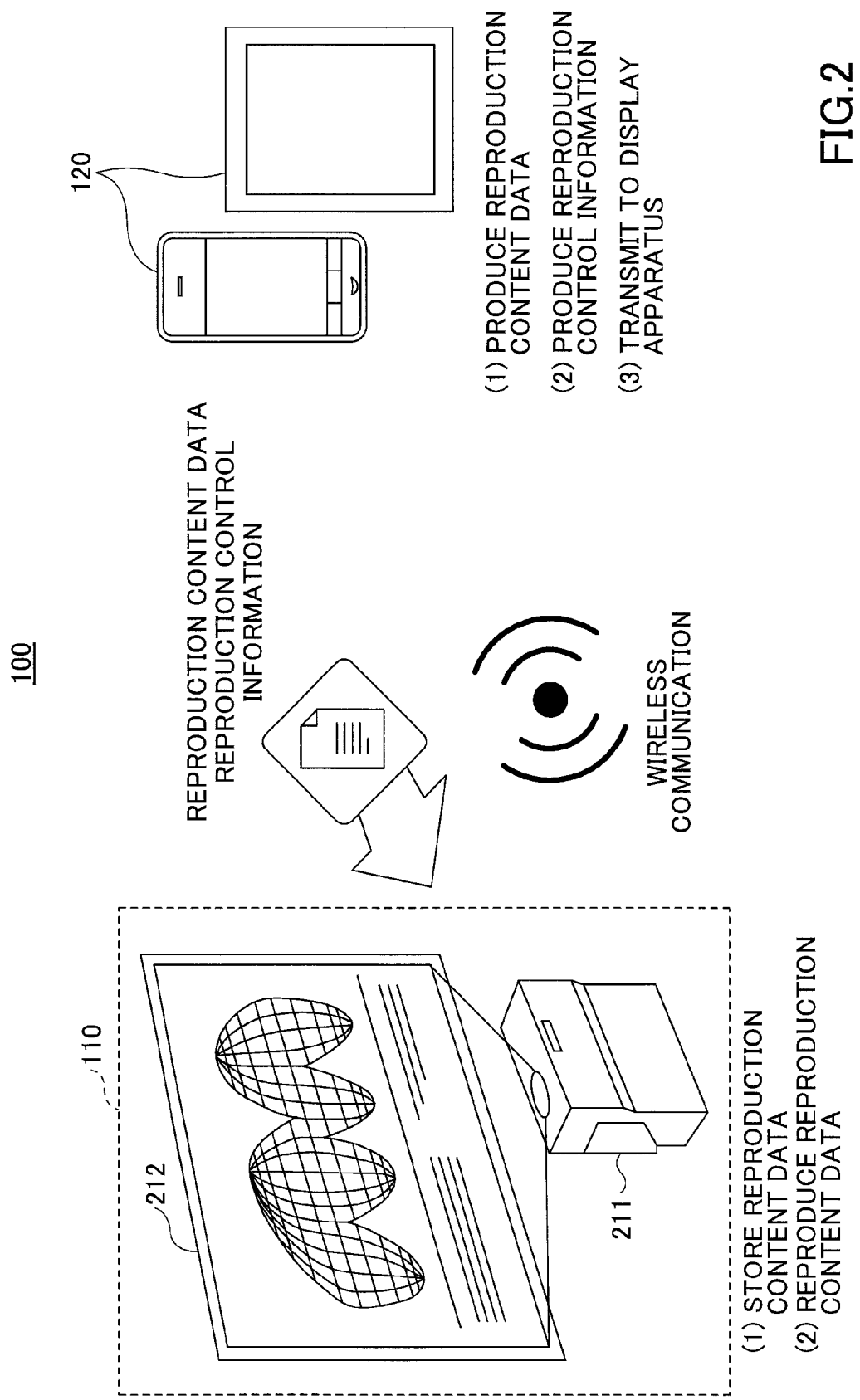

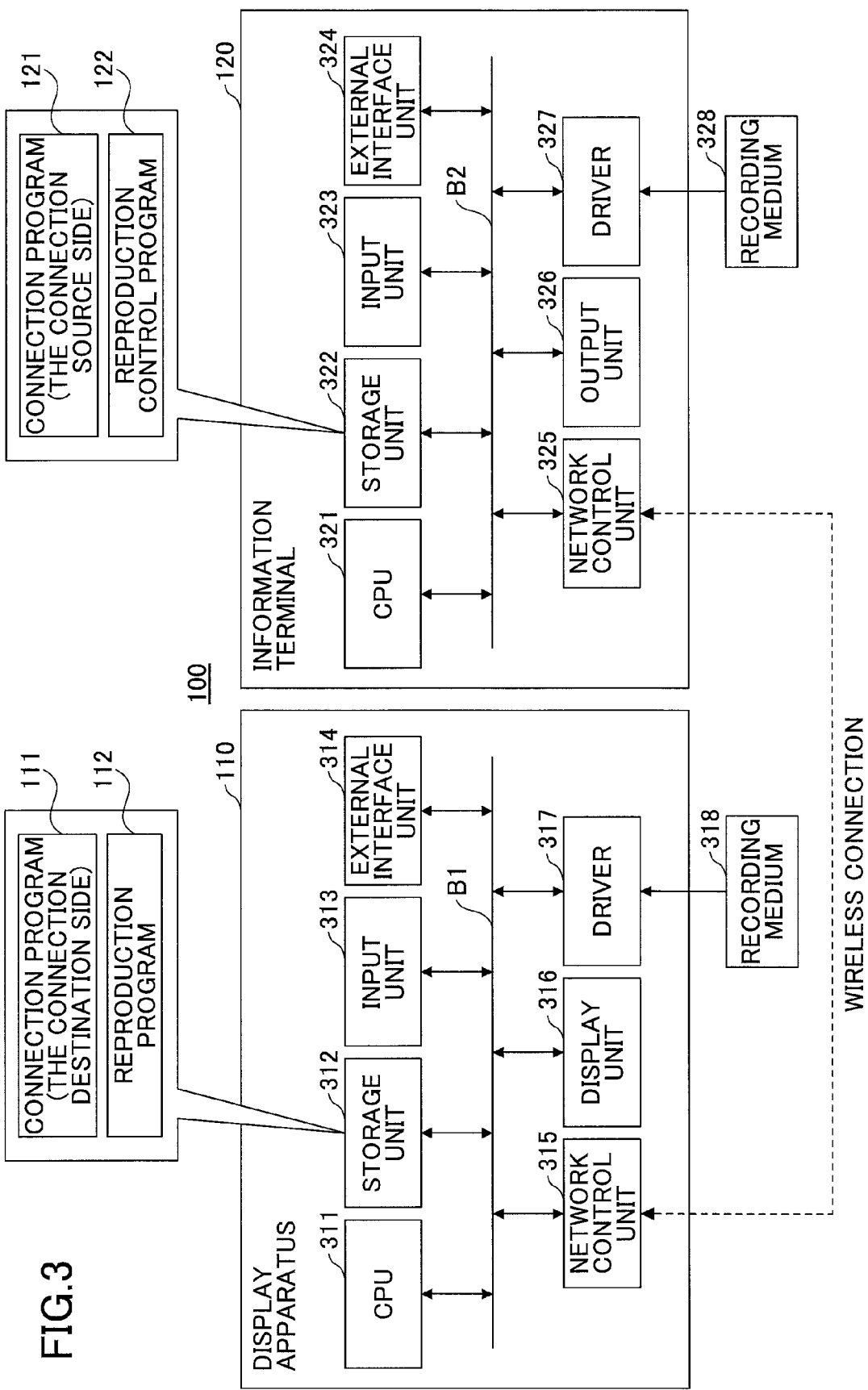

FIG.4C

| SETTING ITEM | SETTING INFORMATION |
|---|---|
| COMMUNICATION MODE | |
| AUTHENTICATION SCHEME | |
| ENCRYPTION SCHEME | |
| FREQUENCY CHANNEL | |
| TRANSMISSION STANDARD | |
| COMMUNICATION PROTOCOL | |
| IPv4 ADDRESS OF WIRELESS APPARATUS TO BE CONNECTED | |
| IPv4 SUBNET MASK ADDRESS | |

FIG.4D

| BYTE NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| SSID | | | | | | | | | | | | | | | | | | | | | | | | | | | | | | | | |

SCHEME IDENTIFIER | TABLE IDENTIFIER | APPARATUS NAME FOR DISPLAY | INDIVIDUAL IDENTIFIER

FIG.6

(a) SSID(A)

| BYTE NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| SSID | R | T | C | 0 | 0 | 1 | W | i | r | e | l | e | s | s | D | e | v | 0 | E | 0 | 0 | 0 | 1 | 6 | 4 | 1 | E | D | 1 | E | 5 | A |

(b) SSID(A')

| BYTE NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| SSID | R | T | C | 0 | 0 | 1 | W | i | r | e | l | e | s | s | D | e | v | 0 | E | 0 | 0 | 1 | 2 | 3 | 4 | 5 | E | D | 1 | E | 5 | A |

(c) SSID(B)

| BYTE NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| SSID | R | T | C | 0 | 0 | 2 | W | i | r | e | l | e | s | s | D | e | v | 1 | F | 3 | 1 | 2 | 3 | 4 | 5 | 6 | E | D | 2 | E | 8 | A |

(d) SSID(C)

| BYTE NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| SSID | R | T | C | 0 | 0 | 3 | W | i | r | e | l | e | s | s | D | e | v | 3 | J | 5 | 0 | 0 | 9 | 8 | 7 | 6 | E | D | 3 | E | 9 | A |

(e) SSID(X)

| BYTE NUMBER | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| SSID | x | x | x | x | x | x | x | x | x | x | x | x | x | x | x | x | x | x | x | x | x | x | x | x | x | x | x | x | x | x | x | x |

SCHEME IDENTIFIER | TABLE IDENTIFIER | APPARATUS NAME FOR DISPLAY | INDIVIDUAL IDENTIFIER

FIG.7A

| | 001 |
|---|---|
| COMMUNICATION MODE | AD-HOC |
| AUTHENTICATION SCHEME | OPEN SYSTEM |
| ENCRYPTION SCHEME | WEP(Pass:XXX) |
| FREQUENCY CHANNEL | 11 |
| TRANSMISSION STANDARD | IEEE802.11n |
| COMMUNICATION PROTOCOL | IPv4 |
| IPv4 ADDRESS OF WIRELESS APPARATUS TO BE CONNECTED | 169.254.1.1 |
| IPv4 SUBNET MASK ADDRESS | 255.255.0.0 |

FIG.7B

| | 002 |
|---|---|
| COMMUNICATION MODE | SOFT AP MODE |
| AUTHENTICATION SCHEME | OPEN SYSTEM |
| ENCRYPTION SCHEME | WPA(Pass:XXX) |
| FREQUENCY CHANNEL | 13 |
| TRANSMISSION STANDARD | IEEE802.11n |
| COMMUNICATION PROTOCOL | IPv4 |
| IPv4 ADDRESS OF WIRELESS APPARATUS TO BE CONNECTED | 169.254.1.1 |
| IPv4 SUBNET MASK ADDRESS | 255.255.0.0 |

FIG.7C

| | 003 |
|---|---|
| COMMUNICATION MODE | AD-HOC |
| AUTHENTICATION SCHEME | OPEN SYSTEM |
| ENCRYPTION SCHEME | WPA(Pass:XXX) |
| FREQUENCY CHANNEL | 11 |
| TRANSMISSION STANDARD | IEEE802.11n |
| COMMUNICATION PROTOCOL | IPv6 |
| IPv6 ADDRESS OF WIRELESS APPARATUS TO BE CONNECTED | 2001:0db8:bd05:01d2:288a:1fc0:0001:10ee |
| IPv6 PREFIX | 2001:0db8:bd05:01d2 |

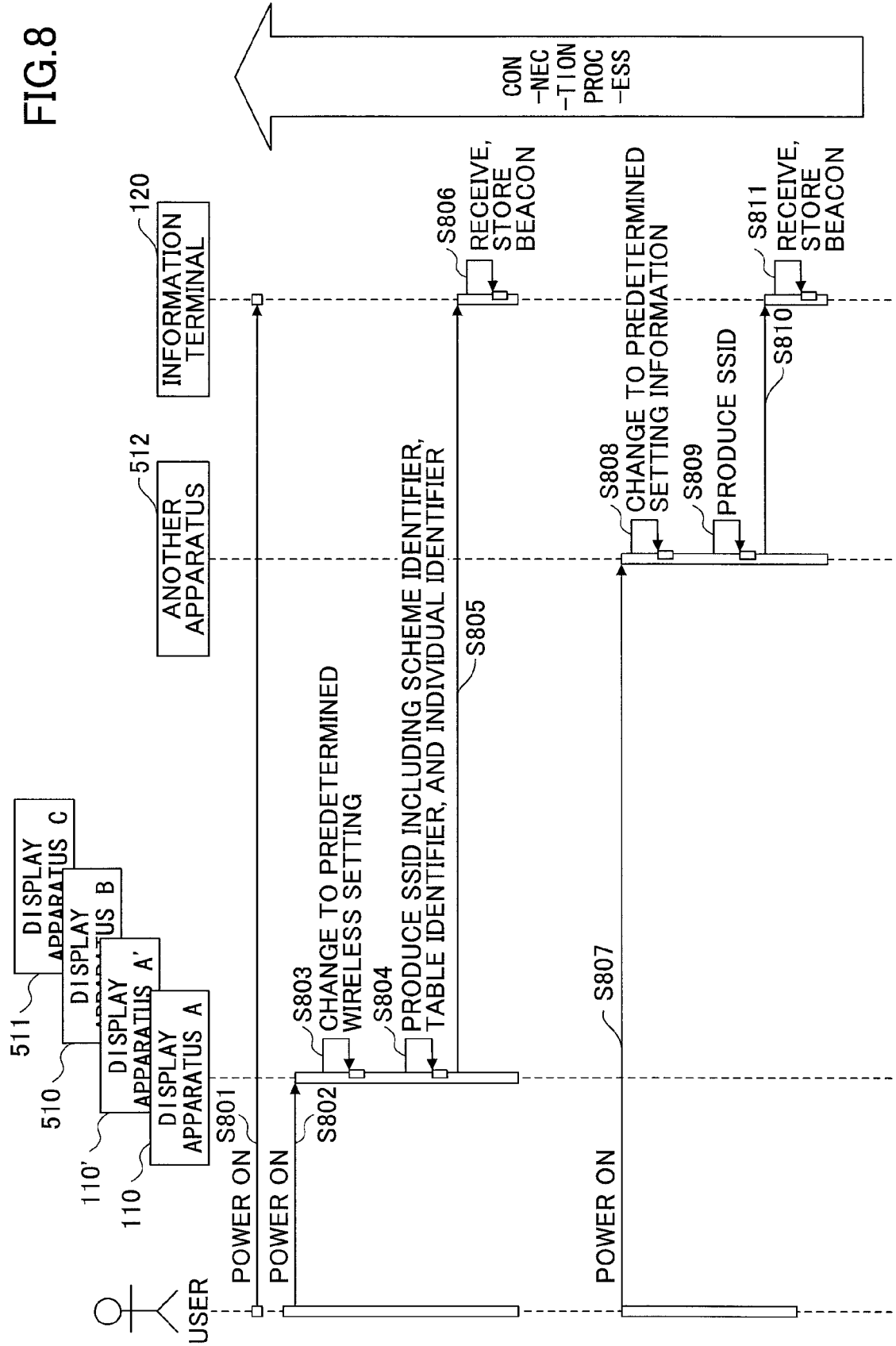

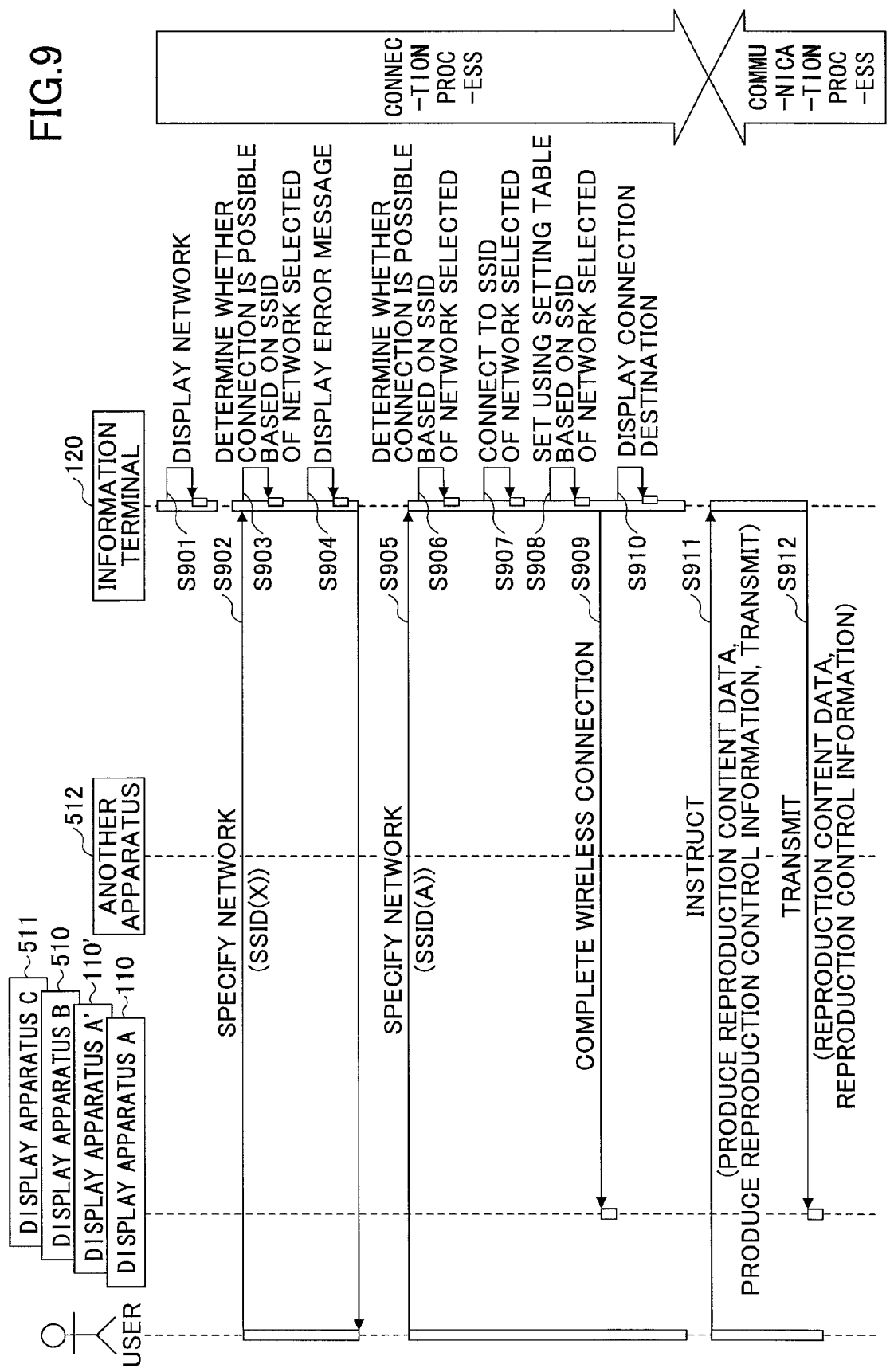

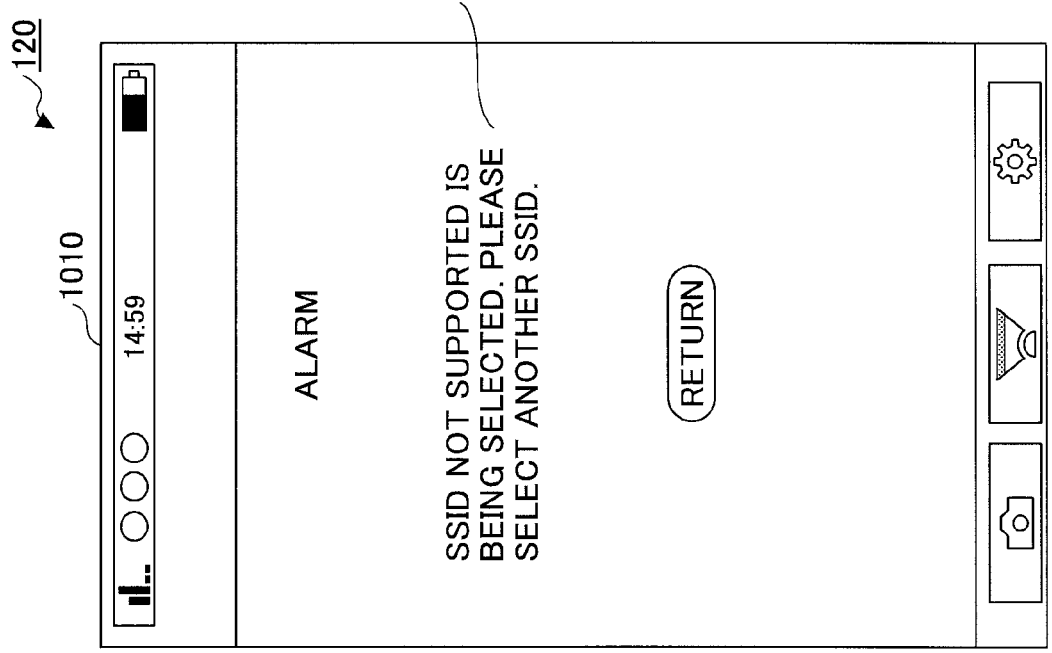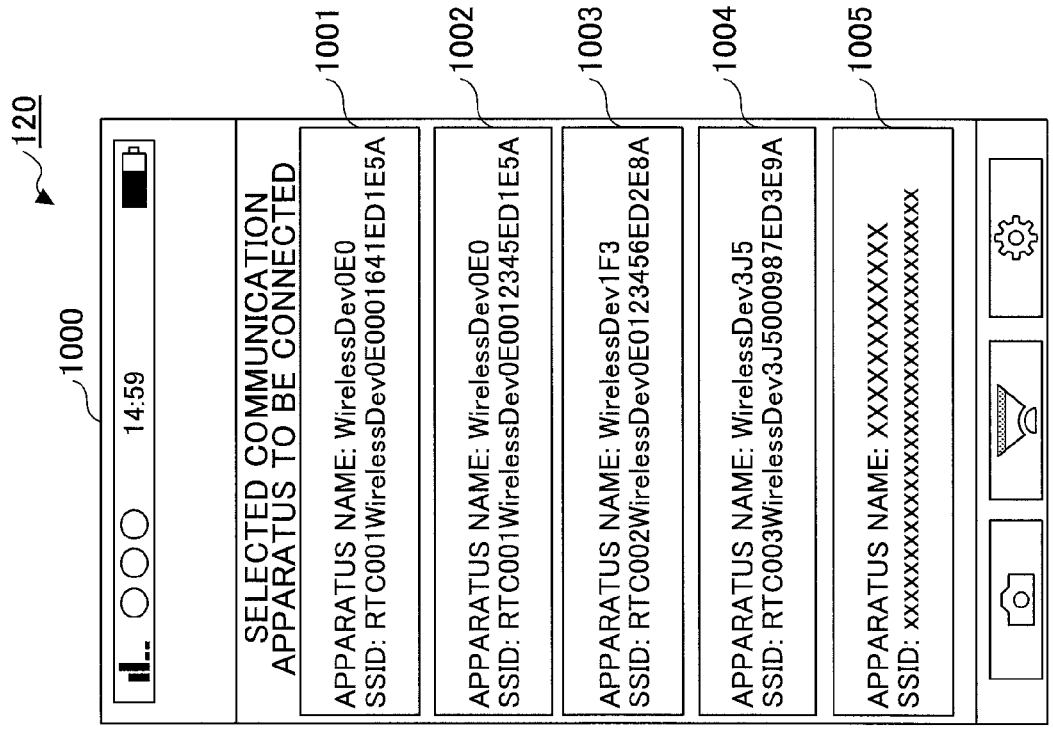

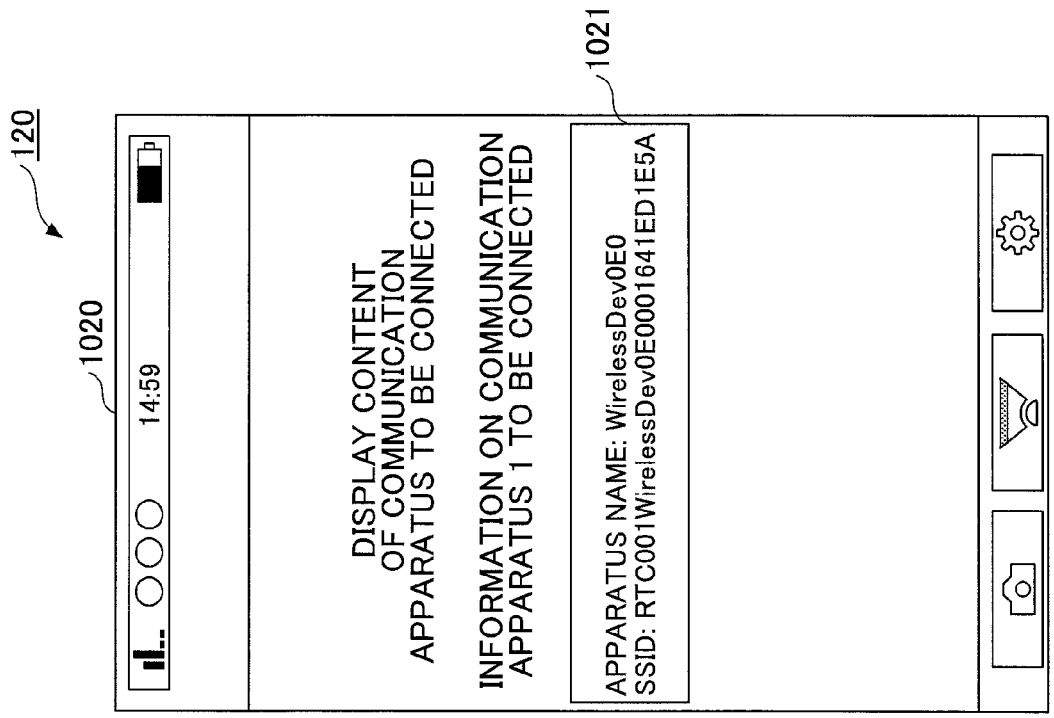
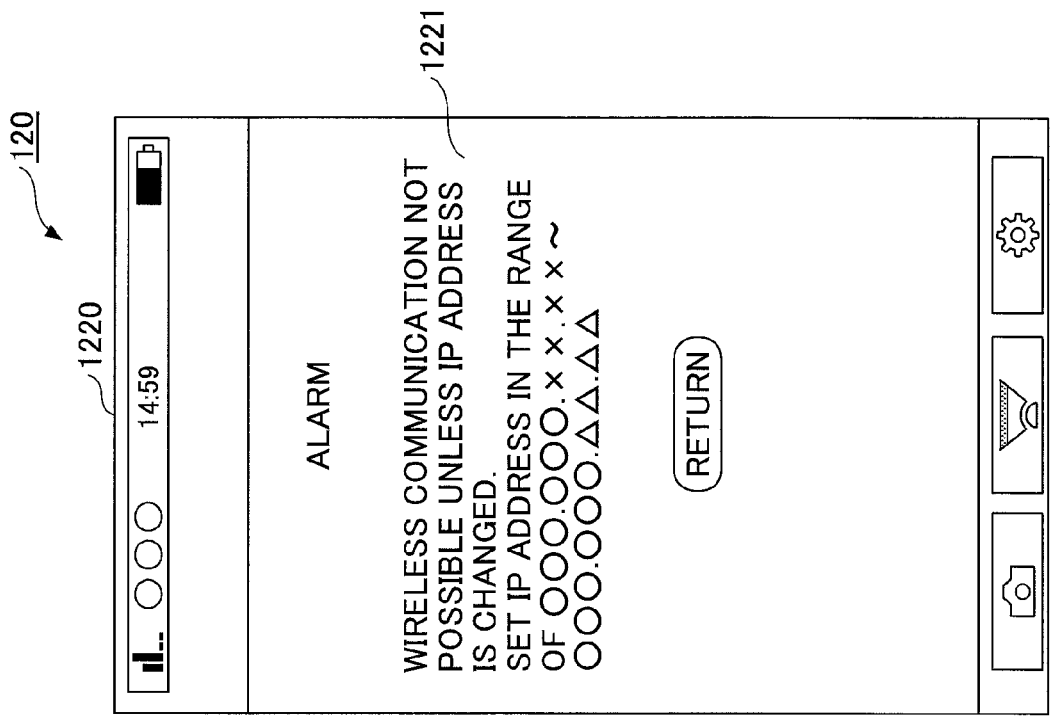

FIG.13A 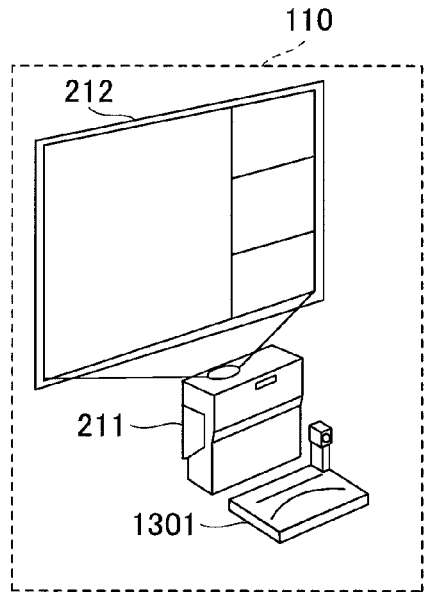 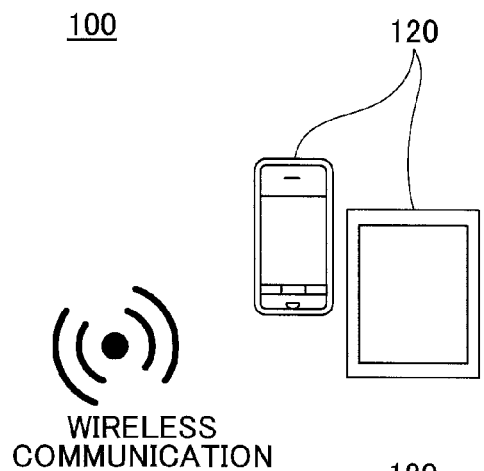
FIG.13B 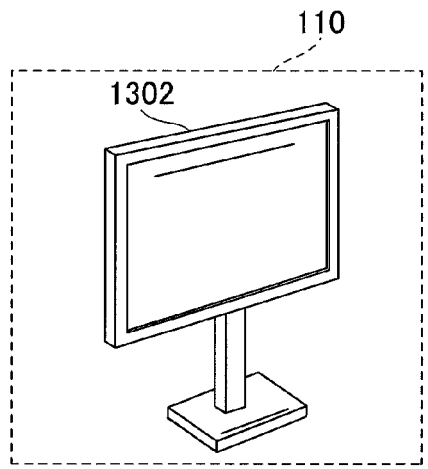 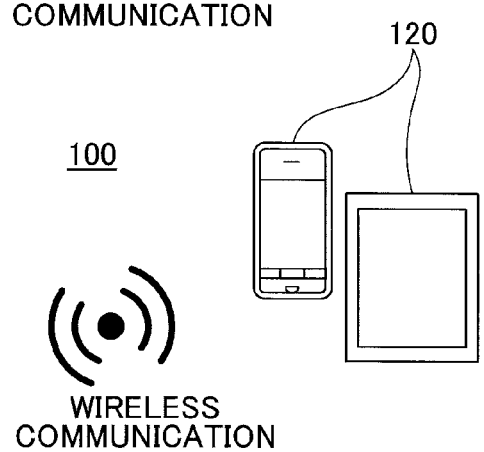
FIG.13C 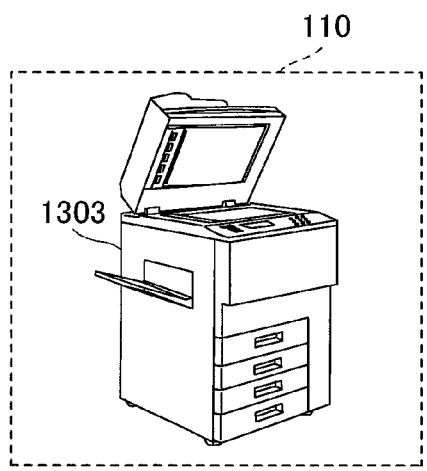 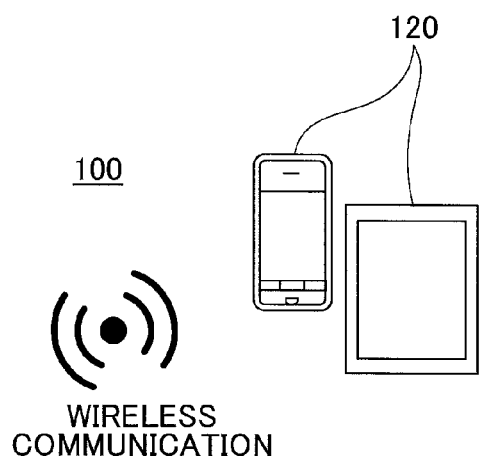

COMMUNICATION SYSTEM, COMMUNICATION CONTROL SYSTEM, COMMUNICATION APPARATUS, COMMUNICATION METHOD, AND CONNECTION PROGRAM

TECHNICAL FIELD

The present invention generally relates to wireless connection techniques and, more specifically relates to communication systems, communication control systems, communication apparatuses, communication methods, and connection programs.

BACKGROUND ART

In the related art, various systems are known for wirelessly connecting electronic apparatuses together via a network, and transmitting/receiving data.

Generally, in order to transmit/receive the data via the network, a communication apparatus on the connection source side, as a connection process, needs to specify the network as a connection destination and set setting information (for example, an IP address, a subnet mask, an authentication scheme, an encryption scheme, etc.) which is needed for wireless communication. However, there are problems that the above-mentioned setting is not easy for a user, and, moreover, that a certain amount of time is required for the connection process. Therefore, in the related art, various proposals are being made for speedily making wireless connections to the network and facilitating connection operations for the user.

For example, in Patent Documents 1 and 2 are disclosed proposed features in which a communication apparatus on the connection destination side produces an SSID (Service Set Identifier) in which is described an individual identifier (for example, an apparatus name) and an IP address of the own apparatus and includes the SSID in a beacon to transmit the beacon.

The features disclosed in the above-mentioned related-art documents make it possible for the communication apparatus on the connection source side to set setting information necessary for wireless communication based on information included in a received beacon, facilitating connection operations for the user. Moreover, it is not necessary for the communication apparatus on the connection source side to conduct scanning to search for a network as a connection destination, making it possible to reduce scan time.

PATENT DOCUMENT

Patent Document 1: JP2006-254301A
Patent Document 2: JP2011-188238A

However, with the features disclosed in Patent Documents 1 and 2, there is a problem that the time for the connection process increases if a user carries out erroneous connection operations.

For example, if the user selects an erroneous connection destination while receiving multiple beacons, the communication apparatus on the connection source side transmits results of the setting in the own apparatus to the erroneous connection designation, and waits for a response during a certain period. In this case, the time for the connection process increases.

DISCLOSURE OF THE INVENTION

In light of solving the problem as described above, an object of the present invention is to make it possible to speedily conduct wireless connections.

According to an embodiment of the present invention, a communication system having a first communication apparatus and a second communication apparatus is provided, wherein the first communication apparatus includes a transmission unit which transmits a signal including at least a network identifier, and wherein the second communication apparatus includes a selection unit which selects a network identifier included in a signal received; and a control unit which connects to a network of the network identifier selected when predetermined information is included in a predetermined location in the network identifier selected and which outputs an alarm when the predetermined information is not included in the predetermined location in the network identifier selected.

The communication system according to the embodiment of the present invention makes it possible to speedily conduct wireless connections.

BRIEF DESCRIPTION OF THE DRAWINGS

Other objects, features, and advantages of the present invention will become more apparent from the following detailed descriptions when read in conjunction with the accompanying drawings, in which:

FIG. 1 is a diagram illustrating a system configuration of a reproduction system which is one example of a communication system according to an embodiment;

FIG. 2 is a diagram for explaining one example of a usage scene of the reproduction system;

FIG. 3 is a diagram for explaining one example of a hardware configuration of the respective apparatuses included in the reproduction system;

FIGS. 4A to 4D are diagrams for explaining one example of a functional configuration related to wireless connection of the respective apparatuses included in the reproduction system;

FIG. 6 is a diagram illustrating an example of an SSID included in a beacon transmitted by a display apparatus which is one example of a communication apparatus on the connection destination side;

FIGS. 7A-7C are diagrams illustrating exemplary setting tables in which is stored setting information used in wireless communication;

FIG. 8 is a sequence diagram illustrating a flow of the connection process in the reproduction system;

FIG. 9 is a sequence diagram illustrating a flow of the connection process in the reproduction system;

FIG. 10A to 10C are diagrams illustrating one example of a display screen for a connection operation in an information terminal as one example of a communication apparatus on the connection source side;

FIGS. 12A-12D are diagrams illustrating an example of the display screen for the connection operation in the information terminal; and FIGS. 13A to 13C are diagrams illustrating one example of a system configuration when a communication system is configured using various electronic apparatuses.

BEST MODE FOR CARRYING OUT THE INVENTION

Figure 4A:
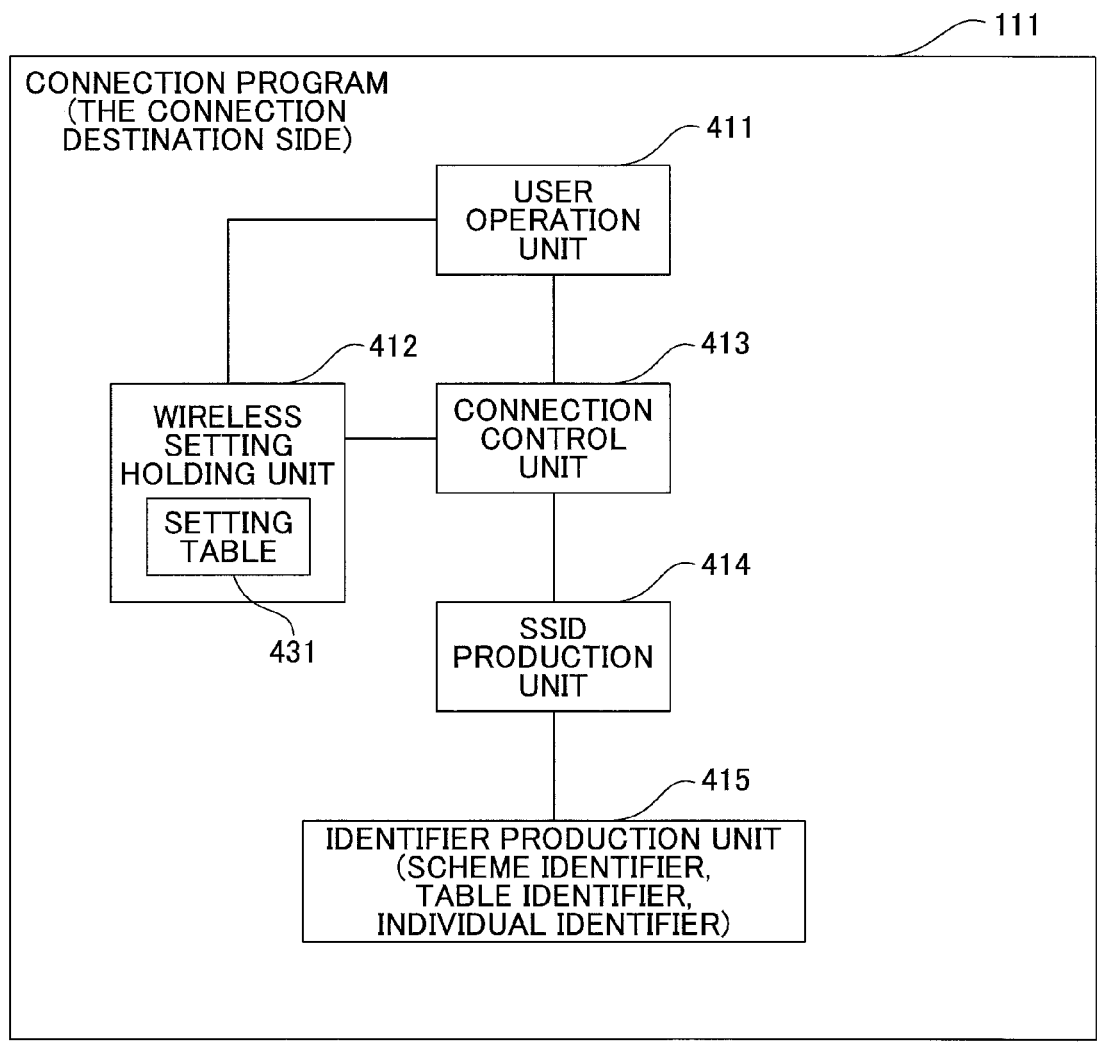

Below, the respective embodiments of the present invention are described with reference to the drawings. A wireless connection technique according to the below-described respective embodiments is realized in a reproduction system which includes an information terminal and a display apparatus, for example. More specifically, it is realized in a reproduction system, wherein the information terminal produces reproduction control information, which is information on reproduction of content data, and transmits it with the content data to a display apparatus to reproduce the content data based on the reproduction control information.

In other words, the below-described reproduction system is one example of a communication system according to the present invention, and an information terminal and a display apparatus which make up the reproduction system is one example of a communication apparatus according to the present invention. Moreover, a reproduction control system including a program for connecting the information terminal and the display apparatus is one example of a communication control system according to the present invention.

Below, the reproduction system, as well as the information terminal and the display apparatus which make up the reproduction system, is described in detail, after which details of a wireless connection technique of the respective embodiments realized in the reproduction system are described.

First Embodiment

System Configuration of Reproduction System

First, a system configuration of a reproduction system is described. FIG. 1 is a diagram illustrating a system configuration of a reproduction system 100 which is one example of a communication system according to the present embodiment.

The reproduction system 100 includes a display apparatus 110 and an information terminal 120 as one example of a communication apparatus according to the present embodiment. In the reproduction system 100, the information terminal 120 and the display apparatus 110 are wirelessly connected in a communicative manner via a data transmission line N such as a network, etc.

The information terminal 120 is configured to conduct wireless communication by a communication scheme which is compliant with standards such as 3G ($3^{rd}$ generation), LTE (Long Term Evolution), 4G ($4^{th}$ generation), etc., for example. The information terminal 120 may be configured to conduct wireless communication by a communication scheme which is compliant with ZigBee (registered trademark), Bluetooth (registered trademark), etc., for example.

The information terminal 120 may be, for example, a wireless communication terminal such as a smartphone, a mobile phone, etc., a tablet PC (personal computer), or a notebook PC, as long as it is any equipment unit which may conduct communication with the display apparatus 110.

In the information terminal 120 are installed a connection program (on the connection source side) 121 and a reproduction control program 122 according to the present embodiment. The information terminal 120 wirelessly connects to the display apparatus 110 by executing the connection program (the connection source side) 121. Moreover, the reproduction control program 122 is executed while the information terminal 120 is wirelessly connected to the display apparatus 110 to produce reproduction control information on content data displayed on the display apparatus 110 and transmit the produced results with the content data to the display apparatus 110.

In the display terminal 110 are installed a connection program (on the connection destination side) 111 and a reproduction program 112. The display apparatus 110 can execute the connection program (the connection destination side) 111 to set setting information necessary for wireless communication in the information terminal 120. Moreover, the reproduction program 112 may be executed to reproduce content data transmitted from the information terminal 120 based on reproduction control information.

The display apparatus 110 may include display and wireless communication functions in which content data are displayed based on reproduction control information transmitted from the information terminal 120, and may be an equipment unit such as a projector, a display, etc., for example.

In the explanations of the present embodiments, displaying of content data by the display apparatus 110 in accordance with reproduction control information is expressed as reproducing content data.

Moreover, the content data in the explanations of the present embodiments include image (still picture) data, video data, etc., for example. Moreover, image data as content data may be image data including one image, for example, or may be image data sets including multiple images. In other words, the content data in the explanations of the present embodiments may be any data as long as they are data which can be reproduced in the display apparatus 110.

In the below-described explanations of the respective embodiments, content data reproduced in the display apparatus 110 are called "reproduction content data", while other content data, such as those which are stored in a predetermined storage area, for example, are merely called "content data".

Explanation of Usage Scene of Reproduction System

Next, a usage scene of the reproduction system 100 is explained with reference to FIG. 2. FIG. 2 is a diagram for explaining one example of a usage scene of the reproduction system 100.

In the example of FIG. 2, the reproduction system 100 is shown which uses a smartphone or a tablet PC as the information terminal 120 and uses a projector 211 and a screen 212 as the display apparatus 110. The reproduction system 100 may be utilized as a digital signage, for example.

In the information terminal 120, when content data are selected by a user, reproduction content data are produced. Moreover, when a method of reproducing reproduction content data is set, reproduction control information for the reproduction content data is produced based on the setting. Then, in the information terminal 120, the reproduction content data and reproduction control information are transmitted to the projector 211. In the projector 211, received reproduction content data are stored in a storage unit 312 (described below) and the reproduction content data are reproduced in accordance with reproduction control information.

In this way, according to the reproduction system 100, a user may transmit the reproduction content data and the reproduction control information once from the information terminal 120 to the display apparatus 110 to cause the reproduction content data to be reproduced in the display apparatus 110 continuously in accordance with desired settings.

In other words, when the reproduction system 100 is utilized for the digital signage, etc., the desired reproduction content data are reproduced automatically, so that the need is eliminated for the user to conduct settings related to a display sequence of the reproduction content data and switching of a display on all such occasions.

Hardware Configuration of Reproduction System

Next, a hardware configuration of the respective apparatuses included in the reproduction system 100 is explained with reference to FIG. 3. FIG. 3 is a diagram illustrating one example of the hardware configuration of the respective apparatuses (the display apparatus 110 and the information terminal 120) included in the reproduction system 100.

The information terminal 120 includes a CPU (central processing unit) 321, a storage unit 322, an input unit 323, an external interface unit 324, a network control unit 325, an output unit 326, and a driver 327. These elements are mutually connected via a bus B2.

The CPU 321 is a computer which controls various operations of the information terminal 120. The storage unit 322 stores various programs including a reproduction control program 122 and a connection program (the connection source side) 121 that are executed by the CPU 321; and various information sets on the process and operation of the information terminal 120. The input unit 323 is used for inputting various signals and information. The input unit 323 may include a display function such as a touch panel, etc., for example. Moreover, the input unit 323 may be a pointing device, a keyboard, etc., for example.

The external interface unit 324 may be a USB (universal serial bus) memory slot, NFC (near-field communication), etc. The network control unit 325, which includes a modem, a LAN card, etc., is used for wirelessly connecting to the network and conducting wireless communication via the network. Moreover, in the present embodiment, for example, it is wirelessly connected to the display apparatus 110 and is used to conduct wireless communication with the display apparatus 110.

The output unit 326 is used for externally outputting various information sets from the information terminal 120. The output unit 326 may be, for example, a display, etc., or may be a transmission unit which transmits various information sets to an external apparatus.

The connection program (the connection source side) 121 and the reproduction control program 122 according to the present embodiment are at least a part of various programs which control the information terminal 120 and are provided by downloading from a network, distribution of a recording medium 328, etc., for example.

Here, the recording medium 328 having stored therein the connection program (the connection source side) 121 and the reproduction control program 122 may be combined with the display apparatus 110 and provided to the user as a reproduction control system. Alternatively, it may be provided to the user separately from the display apparatus 110. In other words, only the recording medium 328 having stored thereon the connection program (the connection source side) 121 and the reproduction control program 122 may be provided solely to the user. Alternatively, only the connection program (the connection source side) 121 and the reproduction control program 122 may be solely downloaded to provide the downloaded results to the user. Of course, they may be provided to the user as the information terminal 120 in which they are installed from the beginning.

For the recording medium 328 having stored therein the connection program (the connection source side) 121 and the reproduction control program 122, a recording medium which optically, electrically, or magnetically records information, such as a CD-ROM, a flexible disk, an opto-magnetic disk, etc., may be used. Alternatively, a recording medium such as a semiconductor memory that electrically records information may be used, such as a ROM, a flash memory, etc.

When the recording medium 328 having recorded therein the connection program (the connection source side) 121 and the reproduction control program 122 are set to a driver 327, the connection program (the connection source side) 121 and the reproduction control program 122 are installed in the storage unit 322 from the recording medium 328. When the connection program (the connection source side) 121 and the reproduction control program 122 are downloaded from the network, they are installed in the storage unit 322 via the network control unit 325.

The storage unit 322 stores therein various programs including the installed connection program (the connection source side) 121 and reproduction control program 122 as well as necessary files, data, etc. In accordance with the connection program (the connection source side) 121 and the reproduction control program 122 that are stored in the storage unit 322, the CPU 321 realizes various processes (connection process, communication process etc.) as described below.

The display apparatus 110 includes a CPU 311, a storage unit 312, an input unit 313, an external interface unit 314, a network control unit 315, a display unit 316, and a driver 317 that are mutually connected via a bus B1.

The CPU 311 is a computer which controls various operations of the display apparatus 110. The storage unit 312 stores therein reproduction content data which are reproduced by the display apparatus 110, various programs including the connection program (the connection destination side) 111 and the reproduction program 112 that are executed by the CPU 311, and various information sets on the process and the operation of the display apparatus 110. The input unit 313 is used for inputting various signals and information. The input unit 313 is an operation member which operates the display apparatus 110, for example.

The external interface unit 314 may be a USB (universal serial bus) memory slot, NFC (near-field communication), etc., for example. The network control unit 315 wirelessly connects to a network and is used for conducting wireless communication via the network. Moreover, according to the present embodiment, it is used for conducting wireless communication with the information terminal 120, for example. The display unit 316 reproduces reproduction content data which the display apparatus 110 is instructed to reproduce.

The connection program (the connection destination side) 111 and the reproduction program 112 are at least a part of various programs which control the display apparatus 110. The connection program (the connection destination side) 111 and the reproduction program 112 are provided by downloading from the network, distribution of the recording medium 318, etc., for example.

When the recording medium 318 having recorded therein the connection program (the connection destination side) 111 and the reproduction program 112 are set to the driver 317, the connection program (the connection destination side) 111 and the reproduction control program 112 are installed in the storage unit 312 from the recording medium 318. Moreover, when the connection program (the connection destination side) 111 and the reproduction control program 112 are downloaded from the network, they are installed in the storage unit 312 via the network control unit 315.

The storage unit 312 stores the installed connection program (the connection destination side) 111 and the reproduction program 112 and stores information such as necessary files and reproduction content data, etc. By executing the connection program (the connection destination side) 111 and the reproduction program 112 that are stored in the storage unit 312, the CPU 311 realizes various processes (connection process, etc.) as described below.

Functional Configuration Related to Wireless Connection in Reproduction System

Next, with reference to FIGS. 4A to 4D, a functional configuration related to a wireless connection of various apparatuses (the display apparatus 110, the information terminal 120) included in the reproduction system 100 is described. FIGS. 4A to 4D are diagrams illustrating one example of the functional configuration related to the wireless connection of the respective apparatuses (the display apparatus 110 and the information terminal 120) included in the reproduction system 100.

FIG. 4A shows a functional configuration which is realized by the connection program (the connection destination side) 111 included in the display apparatus 110 being executed by the CPU 311, and which is a functional configuration related to wireless connection of the display apparatus 110.

As shown in FIG. 4A, the display apparatus 110 includes a user operation unit 411, a wireless setting holding unit 412, a connection control unit 413, an SSID production unit 414, and an identifier production unit 415.

The user operation unit 411 accepts, from a user, connection operations for conducting wireless connection. The present embodiment is configured such that, when the power of the display apparatus 110 is turned on, the connection program (the connection destination side) 111 is launched, and the operation to turn on the power of the display apparatus 110 is accepted by the user operation unit 411.

The wireless setting holding unit 412 holds a setting table 431 which has stored therein setting information which is set for the display apparatus 110 when the display apparatus 110 wirelessly communicates with the information terminal 120. FIG. 4C is one example of the setting table 431. As shown in FIG. 4C, the setting table 431 includes a setting item and setting information. In conducting wireless communication, the setting information for the setting item shown in FIG. 4C is set for the display apparatus 110. Details of the setting information to be stored in the setting table will be described below.

The connection control unit 413 controls production and transmission of a beacon (a signal including at least a network identifier). Moreover, it sets, within the display apparatus 110, setting information of the setting table 431 held in the wireless setting holding unit 412.

The SSID production unit 414 produces an SSID (service set identifier) to be included in the beacon. Here, the SSID is a network identifier which identifies a network. (For communication via an access point, it is a name for identifying the access point.) A common SSID is set among the respective communication apparatuses in an ad-hoc mode (a mode in which communication is conducted without going through the access point).

The identifier production unit 415 produces a scheme identifier, a table identifier, and an individual identifier that are used for producing the SSID in the SSID production unit 414.

The scheme identifier is an identifier which specifies a scheme of the connection process in the wireless connection. As described below, according to the present embodiment, the display apparatus 110, which is a communication apparatus on the connection destination side and the information terminal 120 which is a communication apparatus on the connection source side performs a connection process under the following assumptions and conducts setting of setting information necessary for wireless communication:

the communication apparatus on the connection source side and the communication apparatus on the connection destination side respectively include a setting table in which is stored setting information for wireless communication;

in the SSID in the beacon is described an identifier which specifies a setting table to be used for wireless communication by the communication apparatus on the connection source side; and the SSID is produced such that it does not overlap with an SSID of the other communication apparatus on the connection destination side.

In the identifier production unit 415, a scheme identifier which includes a specific character sequence is produced to distinguish, from a connection process of the other scheme, a scheme for which the connection process is performed under such assumptions.

The table identifier is an identifier which specifies a setting table in which is stored setting information used in wireless communications. The individual identifier is an identifier including specific information (for example, a manufacturer's serial number, a MAC address, etc.) assigned individually for each apparatus. The individual identifier takes a different value for a separate apparatus unit (or a different individual unit of the network control unit 315).

FIG. 4D is a diagram illustrating one example of the SSID produced in the SSID production unit 414 using the identifier produced in the identifier production unit 415. As illustrated in FIG. 4D, the SSID includes 32 bytes, of which the scheme identifier is described in bytes 0-2. Moreover, the table identifier is described in bytes 3-5. Furthermore, information on the display apparatus, which is a communication apparatus on the connection destination side, is described in bytes 6-19. The information on the communication apparatus on the connection destination side is an apparatus name, for example, and the apparatus name is used for displaying an apparatus which transmits a beacon including the SSID in the information terminal 120. Moreover, the individual identifier is described in bytes 20-31. Specific examples of the SSID are described below.

Figure 4B:
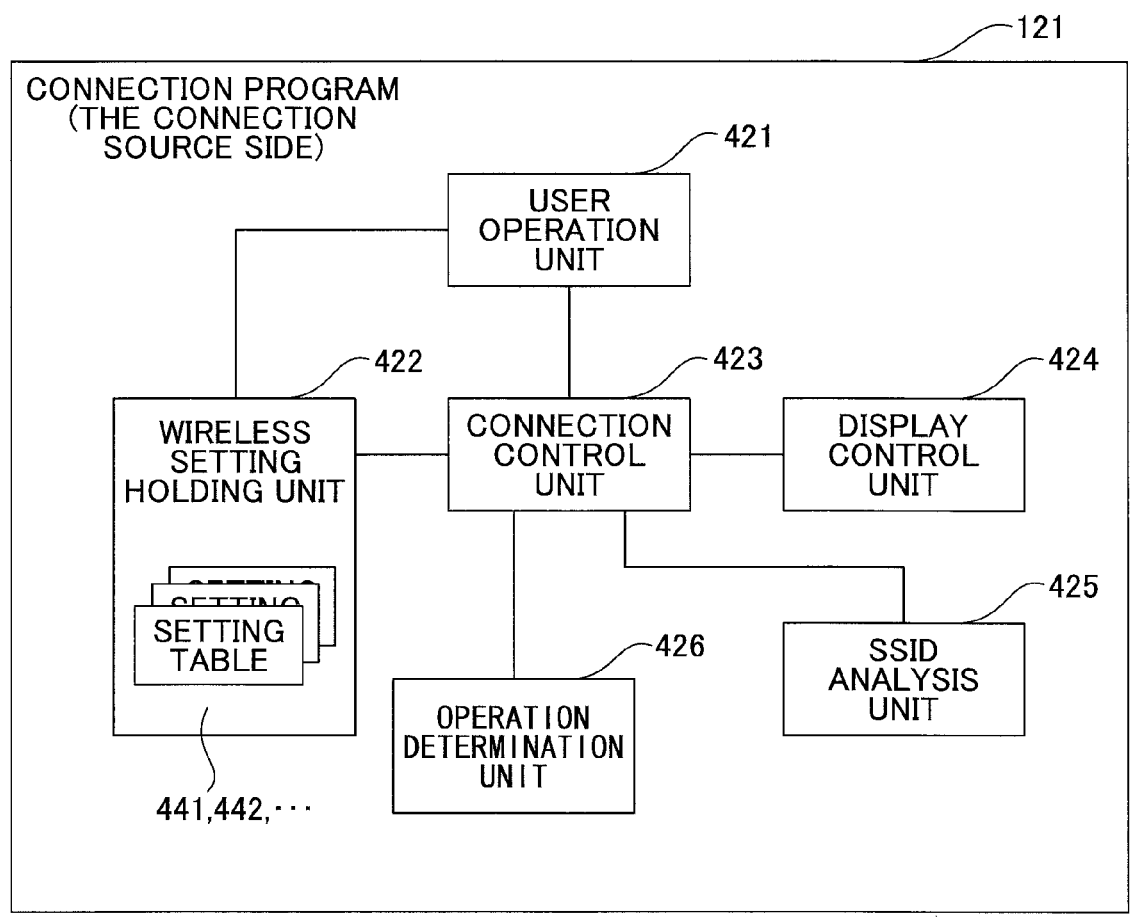

FIG. 4B shows a functional configuration which is related to wireless connection of the information terminal 120 and realized by the connection program (the connection source side) 121 included in the information terminal 120 being executed by the CPU 321 as a functional configuration.

As shown in FIG. 4B, the information terminal 120 includes a user operation unit 421, a wireless setting holding unit 422, a connection control unit 423, a display control unit 424, an SSID analysis unit 425, and an operation determination unit 426.

The user operation unit 421 accepts, from a user, a connection operation for conducting wireless connection. In the present embodiment, an operation for turning on the power of the information terminal 120 and an operation for launching the reproduction control program 122 or an operation for selecting the SSID are accepted. The present embodiment is configured such that the reproduction control program 122 is launched to automatically launch the connection program (the connection source side) 121.

The wireless setting holding unit 422 holds setting tables 441, 442, . . . , which have stored therein setting information which is set in the information terminal 120 when the information terminal 120 wirelessly communicates with the display apparatus 110. It is assumed that the same setting table as the setting 431 held in the display apparatus 110 is included in the setting tables 441, 442, held in the wireless setting holding unit 422.

As described below, the information terminal 120 is configured to be able to wirelessly communicate with any display apparatus which transmits a beacon including an SSID in which are described respectively different table identifiers. Therefore, in the wireless setting holding unit 422, multiple setting tables corresponding to the respective table identifiers are held. Specific examples of the setting table are described below.

The connection control unit 423 receives a beacon transmitted from the respective apparatuses including the display apparatus 110. Moreover, a network to be a connection destination is set based on an SSID selected by a user from SSIDs included in the respective beacons received. Furthermore, based on the table identifier included in the SSID selected, a setting table (for example, the setting table 441) for use in wireless connections from setting tables held in the wireless setting holding unit 422 is read and set within the information terminal.

The display control unit 424 displays a launch screen for launching the reproduction control program 122. Moreover, a selection screen is displayed such that the user may select the SSID as a network of the connection destination from the SSIDs included in the respective beacons received.

Moreover, if an apparatus corresponding to the SSID selected by the user in the selection screen is not an apparatus with which can be wirelessly connected to by the information terminal 120, the display control unit 424 outputs an alarm. Moreover, if the apparatus corresponding to the SSID selected by the used in the selection screen is an apparatus which can be wirelessly connected to and a wireless connection with the network of the connection destination is completed, information (an apparatus name, etc.) on the connection destination is displayed.

The SSID analysis unit 425 extracts an SSID using the beacon received. Moreover, the SSID extracted is analyzed to extract the scheme identifier, the table identifier, and the apparatus name included in the SSID.

The operation determination unit 426 determines whether the apparatus which corresponds to the SSID selected by the user in the selection screen is an apparatus which can be wirelessly connected to by the information terminal 120.

More specifically, if the scheme identifier included in the SSID selected is a scheme identifier including a specific character sequence, it is determined that the apparatus can be wirelessly connected to. On the other hand, if it is not the scheme identifier including the specific character sequence, it is determined that the apparatus cannot be wirelessly connected to.

Overview of Connection Process

Figure 5:
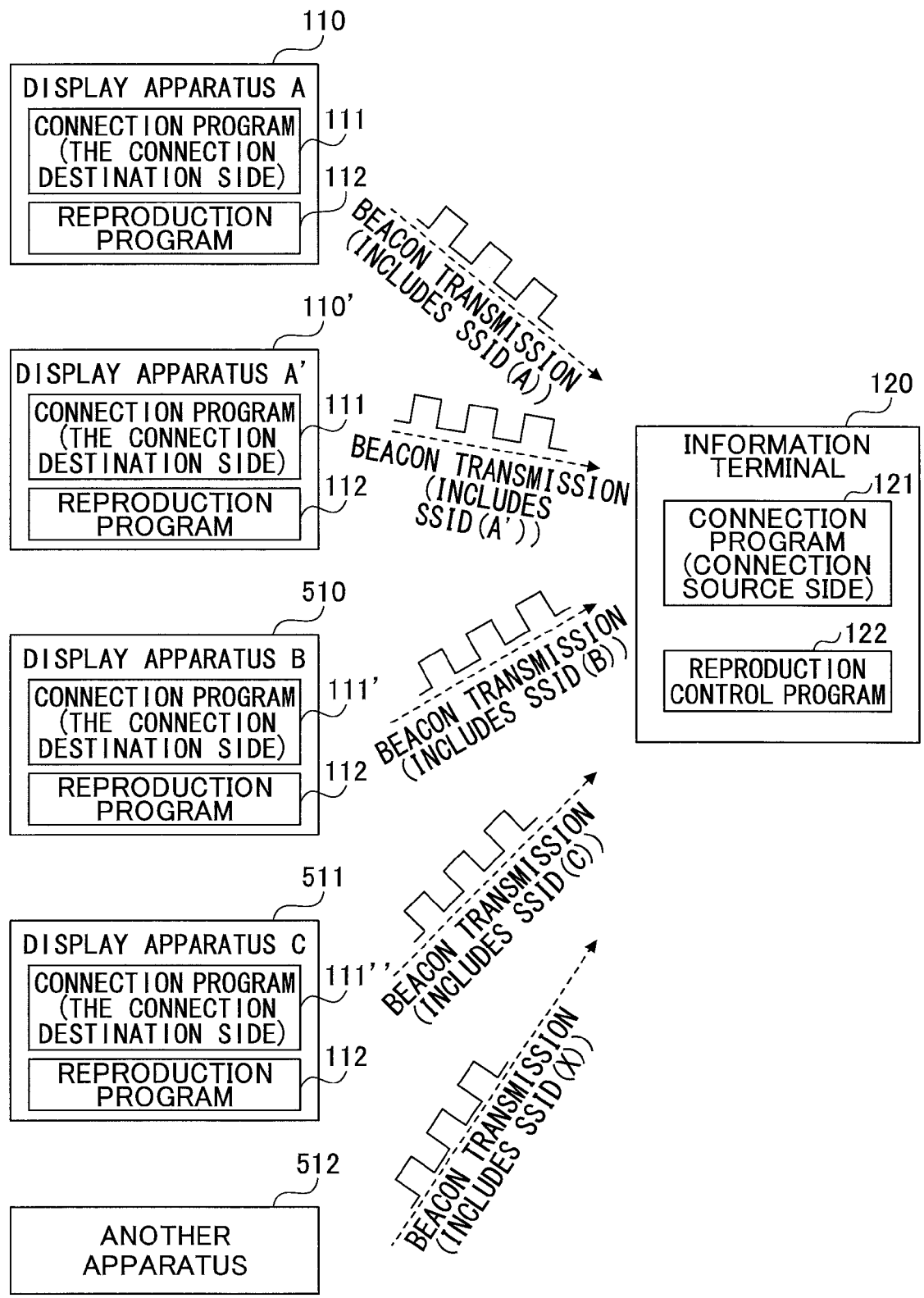
FIG. 5 is a diagram for explaining an overview of a connection process in the reproduction system.

Next, an overview of the connection process in the reproduction system 100 is described using FIG. 5 with reference to FIGS. 4A to 4D. Below, to make it easier to understand the process content of the connection process in the reproduction system 100, a case in described of a user of the information terminal 120 selecting one apparatus from multiple apparatuses to conduct a wireless connection.

An example in FIG. 5 shows a state in which a display apparatus A (110), a display apparatus A' (110'), a display apparatus B (510), a display apparatus C (511), another apparatus 512, and an information terminal 120 are arranged in a mutually neighboring manner and the information terminal 120 receives beacons transmitted from the respective apparatuses. Under such a state, the user of the information terminal 120 selects one apparatus from the display apparatus A (110), the display apparatus A' (110'), the display apparatus B (510), and the display apparatus C (511).

Here, the display apparatus A (110), the display apparatus A' (110'), the display apparatus B (510), and the display apparatus C (511) have connection programs (the connection destination side) 111 installed. On the other hand, the other apparatus 512 does not have the connection program 111 (the connection destination side) installed.

Moreover, the SSID (called an SSID (A)) of the display apparatus A (110) and the SSID (called an SSID (A')) of the display apparatus A' (110') have the same scheme identifier and the same table identifier, but different individual identifiers. On the other hand, the SSID (called an SSID (B)) of the display apparatus B (510) and the SSID (called an SSID (C)) of the display apparatus C (111) have the same scheme identifier as that of the SSID (A) of the display apparatus A (110), but different table and individual identifiers from those of the SSID (A) of the display apparatus A (110). Moreover, the scheme identifier is not included in the SSID (SSID (X)) of the other apparatus 512.

Under these circumstances, in the information terminal 120, the SSID analysis unit 425 extracts the SSID included in the respective beacons received and obtains the apparatus name included in the SSID extracted.

Moreover, in the display control unit 424, the SSID extracted is displayed in the selection screen with the apparatus name and the user is prompted to select an SSID. When the user selects any SSID in the selection screen displayed, the SSID analysis unit obtains information on a predetermined location (a location at which a scheme identifier is to be described) of the SSID selected.

Based on the information obtained in the SSID analysis unit 425, the operation determination unit 426 determines whether the apparatus corresponding to the SSID selected by the user can be wirelessly connected to by the information terminal 120. A case in which the apparatus corresponding to the SSID selected by the user can be wirelessly connected to by the information terminal 120 is a case in which a correct SSID is selected by the user. On the other hand, a case in which the apparatus corresponding to the SSID selected by the user cannot be wirelessly connected to by the information terminal 120 is a case in which an erroneous SSID is selected by the user.

When it is determined to be an apparatus which can be wirelessly connected to (in other words, when a correct selection operation is performed by the user), the connection control unit 423 sets the determined SSID as a network of the connection destination. Moreover, the setting table corresponding to the table identifier included in the determined SSID is read from the wireless setting holding unit 422 and set within the information terminal 120.

On the other hand, when it is determined to be an apparatus which cannot be wirelessly connected to (in other words, when an erroneous selection operation is performed by the user), the display control unit 424 outputs an alarm. In this way, when an erroneous selection operation is performed by the user, an alarm may be output immediately without setting the SSID as a network of the connection destination to avoid an increase in a connection process time caused by an error in the user selection operation.

Specific Example of SSID

Next, a specific example of the SSID produced by the SSID production unit 414 of the connection program (the connection destination side) 111 is described. FIG. 6 is a diagram for explaining a specific example of the SSID produced by the SSID production unit 414 of the connection program (the connection destination side) 111 of the respective apparatuses shown in FIG. 5.

As described above, the SSID includes 32 bytes. Of the SSIDs shown in FIG. 6, (a)-(d) respectively are SSIDs produced by the connection program (the connection destination side) 111. In other words, they are respectively SSIDs produced in the display apparatus A (110), the display apparatus A' (110'), the display apparatus B (510), and the display apparatus C (511) in FIG. 5.

As described above, for the SSIDs produced by the connection program (the connection destination side) 111, the scheme identifier is described for bytes 0-2. Here, for the display apparatus A (110), the display apparatus A' (110'), the display apparatus B (510), and the display apparatus C (511) in FIG. 5, the connection process is performed in accordance with the above-described scheme, so that a scheme identifier including a specific character sequence ("RTC" in an example in FIG. 6) is described.

Moreover, as described above, for the SSIDs produced by the connection program (the connection destination side) 111, the table identifier is described for bytes 3-5. Here, for the display apparatus A (110) and the display apparatus A' (110'), the same setting table is used to conduct the setting, so that the same table identifier is described. On the other hand, for the display apparatus B (510) and the display apparatus C (511), different setting tables are used to conduct the setting, so that different table identifiers are described.

Moreover, as described above, for the SSIDs produced by the connection program (the connection destination side) 111, information on the display apparatus, which is the communication apparatus on the connection destination side, is described for bytes 6-19. Here, for the display apparatus (A) 110 and the display apparatus (A') 110', the product type is the same, so that the same apparatus name is described. On the other hand, for the display apparatus (B) 510 and the display apparatus (C) 511, the product type is different, so that the different apparatus names are described.

Moreover, as described above, for the SSIDs produced by the connection program (the connection destination side) 111, the individual identifier is described for bytes 20-31. Here, for the display apparatus (A) 110, the display apparatus (A') 110', the display apparatus (B) 510, and the display apparatus (C) 511, they are mutually separate individual units so that respectively different individual identifiers are described.

In this way, the individual identifiers are included in the SSIDs, so that the SSIDs do not overlap among multiple display apparatuses. Therefore, the same setting table is used and the SSIDs differ even when the same IP address is set, so that no collision of IP addresses occur among the respective display apparatuses.

On the other hand, the SSID in (e) in FIG. 6 is an SSID produced by the other apparatus 512 in which the connection program (the connection destination side) 111 is not installed. Therefore, the SSID is configured in accordance with a format different from that of the SSID in (a)-(d) in FIG. 6.

Details of Setting Table

Next, setting tables which are held in the wireless setting holding unit 412 of the connection program (the connection destination side) 111 and/or the wireless setting holding unit 422 of the connection program (the connection source side) 121 and which are specified by the table identifier are described.

FIGS. 7A-7C are diagrams illustrating exemplary setting tables included by the display apparatus A (110), the display apparatus A' (110'), the display apparatus B (510), the display apparatus C (511), and/or the information terminal 120. As shown in FIGS. 7A-7C, table identifiers ("001", "002", "003") are given in the setting tables, respectively.

Moreover, as shown in FIGS. 7A, 7B, and 7C, setting information includes a communication mode, an authentication scheme, an encryption scheme, a frequency channel, a transmission standard, a communication protocol, etc. Moreover, it includes an IPv4 address or an IPv6 address, an IPv4 subnet mask address or an IPv6 prefix, etc., of a wireless apparatus to be connected to.

An ad-hoc mode or a soft AP (access point) mode is set for the communication mode. The soft AP mode is a mode which causes a display apparatus, which is a communication apparatus on the connection destination side, to function as an access point at the software level.

As for the authentication scheme and the encryption scheme, various known techniques may be adopted. For example, exemplary encryption schemes include WEP (wired equivalent privacy) and WPA (Wi-Fi Protected Access).

The communication protocol may be IPv (Internet protocol version) 4, IPv6, or a different proprietary protocol. An IPv4 address and an IPv4 subnet mask address are used as a pair and take mutually corresponding values. An IPv6 and an IPv6 prefix also similarly take mutually corresponding values.

In the setting table, a frequency channel and a transmission standard are included in addition to the above-described setting information sets. In the transmission standard, the type of IEEE 802 is specified.

As shown in the table identifier of the SSID shown in FIG. 6, when wirelessly connecting with the display apparatus A (110) or the display apparatus A' (110') in the present embodiment, a setting table (a table identifier 001) of FIG. 7A is used. Moreover, when wirelessly connecting with the display apparatus B (510) and the display apparatus C (511), the setting table (table identifier 002 or 003) in FIG. 7B or FIG. 7C is used.

Flow of Connection Process in Reproduction System

Next, a flow of the connection process in the reproduction system 100 is described. FIGS. 8 and 9 are sequence diagrams showing a flow of the connection process in the reproduction system 100.

First, the user turns on the power of the information terminal 120, launches the reproduction control program 122 to launch the connection program (the connection source side) 121 (step S801). Next, the power of the respective display apparatuses are turned on to launch the connection program 111 (the connection destination side) (step S802).

In the respective display apparatuses, when the connection program 111 (the connection destination side) is launched, the connection control unit 413 changes setting information of the respective display apparatuses to predetermined setting information (step S803). Moreover, the SSID production unit 414 produces the SSID, which includes the scheme identifier, the table identifier, and the individual identifier (step S804).

More specifically, for the display apparatus A (110), a change is made in setting information based on the setting table (001) in FIG. 7A and the SSID (SSID (A)) in (a) in FIG. 6 is produced. Moreover, for the display apparatus A' (110'), a change is made in setting information based on the setting table (001) in FIG. 7A and the SSID (SSID (A')) in (b) in FIG. 6 is produced.

Furthermore, for the display apparatus B (510), a change is made in setting information based on the setting table (002) in FIG. 7B, and the SSID (SSID (B)) in (c) in FIG. 6 is produced. For the display apparatus C (511), a change is made in setting information based on the setting table (003) and the SSID (SSID (A')) in (d) in FIG. 6 is produced.

Next, the respective display apparatuses transmit a beacon including the SSID produced (step S805). In the information terminal 120, the beacons transmitted from the respective display apparatuses are received and stored by the connection control unit 423 (step S806).

Next, the user turns on the power of the other apparatus 512 (step S807). Also, in the other apparatus 512, when the power is turned on, a change is made in predetermined setting information (step S808) and the SSID is produced (step S809). In the other apparatus 512, there is no connection program (the connection destination side) 111 installed, so that the SSID including the scheme identifier, the table identifier, and the individual identifier is not produced (see (e) in FIG. 6). In the other apparatus 512, the setting information to be changed may be setting information in any one of the setting tables exemplified in FIGS. 7A-7C, or setting information in any other setting table.

Next, the other apparatus 512 transmits a beacon including the SSID produced (step S810). In the information terminal 120, the connection control unit 423 receives and stores the beacon transmitted from the other apparatus 512 (step S811).

Next, the process proceeds to FIG. 9. In the information terminal 120, the SSID analysis unit 425 extracts SSIDs from all of the beacons stored in steps S806 and S811. Then, the SSSD extracted is displayed on the selection screen as a network recognized then by the information terminal 120 (step S901).

More specifically, the SSID (A) shown in (a) in FIG. 6 is extracted from the beacon of the display apparatus A (110) and is displayed on the selection screen with the apparatus name included in the SSID (A). Moreover, the SSID (A') shown in (b) in FIG. 6 is extracted from the beacon of the display apparatus A' (110') and is displayed on the selection screen with the apparatus name included in the SSID (A'). Similarly, the SSID (B) shown in (c) in FIG. 6 is extracted from the beacon of the display apparatus B (510) and the SSID (C) shown in (d) in FIG. 6 is extracted from the beacon of the display apparatus C (511), and they are displayed on the selection screen with the apparatus name. Moreover, the SSID (X) shown in (e) in FIG. 6 is extracted from the other apparatus 512 and is displayed on the selection screen with the apparatus name.

FIG. 10A is a diagram illustrating one example of a selection screen 1000 displayed on the display 120. The apparatus name and the SSID that are displayed in areas 1001-1005 are respectively the apparatus name and the SSID that are extracted from the beacons transmitted from the display apparatus (A) 110, the display apparatus (A') 110', the display apparatus (B) 510, the display apparatus (C) 511, and the other apparatus 512.

Here, it is assumed that, in the selection screen 1000 displayed in the information terminal 120, the user specifies the area 1005 and selects, as a network to be connected to, the SSID displayed in the area 1005 (step S902).

In the information terminal 120, the SSID (X) of the specified area 1005 is analyzed to determine whether an apparatus corresponding to the network to be connected is an apparatus which can be wirelessly connected to by the information terminal 120 (step S903).

More specifically, the SSID analyst unit 425 of the information terminal 120 extracts information in bytes 0-2 of the SSID displayed in the specified area 1005. Moreover, the operation determination unit 426 determines whether the information extracted is a scheme identifier which includes a specific character sequence.

The SSID (X) from which the information is extracted is not an SSID produced by the connection program (on the connection destination side) 111, so that the scheme identifier is not included in bytes 0-2. Thus, in step S903, it is determined that the other apparatus 512 which corresponds to the SSID (X) is not an apparatus which can be wirelessly connected by the information terminal 120. Moreover, in step S904, the display control unit 424 outputs an alarm and displays an error message. FIG. 10B is a diagram showing one example of an error message 1011 of an alarm screen 1010 displayed in step S904.

In this way, even when the apparatus which cannot be wirelessly connected to is erroneously selected by the user, the information terminal 120 may immediately determine that there is an error in the selection operation of the user based on the scheme identifier included in the SSID. Moreover, the error message is displayed, so that the user himself may immediately recognize that there is an error in the selection operation.

In other words, for the user, an error message is displayed at a timing at which the selection operation is conducted. Therefore, a situation may be avoided such that the user waits for a response for a certain period in seeking to connect to an erroneous connection destination.

Moreover, that there is an error in the selection operation is explicitly indicated (see an error message 1011 of the alarm screen 1010), the user may easily recognize a cause of the error.

Returning to explanations of FIG. 9, it is assumed that, in the selection screen 1000 displayed in the information terminal 120, the user specifies the area 1001 (A) and selects, as a network to be connected to, the SSID displayed in the area 1001 (step S905).

In the information terminal 120, the SSID (A) of the specified area 1001 is analyzed to determine whether an apparatus corresponding to the network to be connected is an apparatus which can be wirelessly connected to by the information terminal 120 (step S906).

More specifically, the SSID analysis unit 425 of the information terminal 120 extracts information in bytes 0-2 of the SSID displayed in the specified area 1001. Moreover, the operation determination unit 426 determines whether the information extracted is a scheme identifier which includes a specific character sequence.

The SSID (A) from which the information is extracted is an SSID produced by the connection program (on the connection destination side) 111, so that the scheme identifier is described in bytes 0-2. Thus, the operation determination unit 426 determines that the display apparatus (A) 110 which transmits the beacon including the SSID (A) is an apparatus which can be wirelessly connected to by the information terminal 120. Then, the connection control unit 423 sets the SSID (A) as a network to be connected and connects to the SSID (A) (step S907).

Furthermore, the connection control unit 423 reads, from the wireless setting holding unit 422, the setting table (001) corresponding to the table identifier included in the SSID (A), and sets the read setting information of the setting table in the information terminal 120.

Next, in the information terminal 120, the connection control unit 423 transmits, to the connection destination (the display apparatus A here), that the wireless connection has been completed (step S907). Moreover, the display control unit 424 displays information on the connection destination at the output unit 326 of the information terminal 120 (step S910). More specifically, the apparatus name in bytes 6-19 of the SSID is displayed in the output unit 326.

Figure 10C:
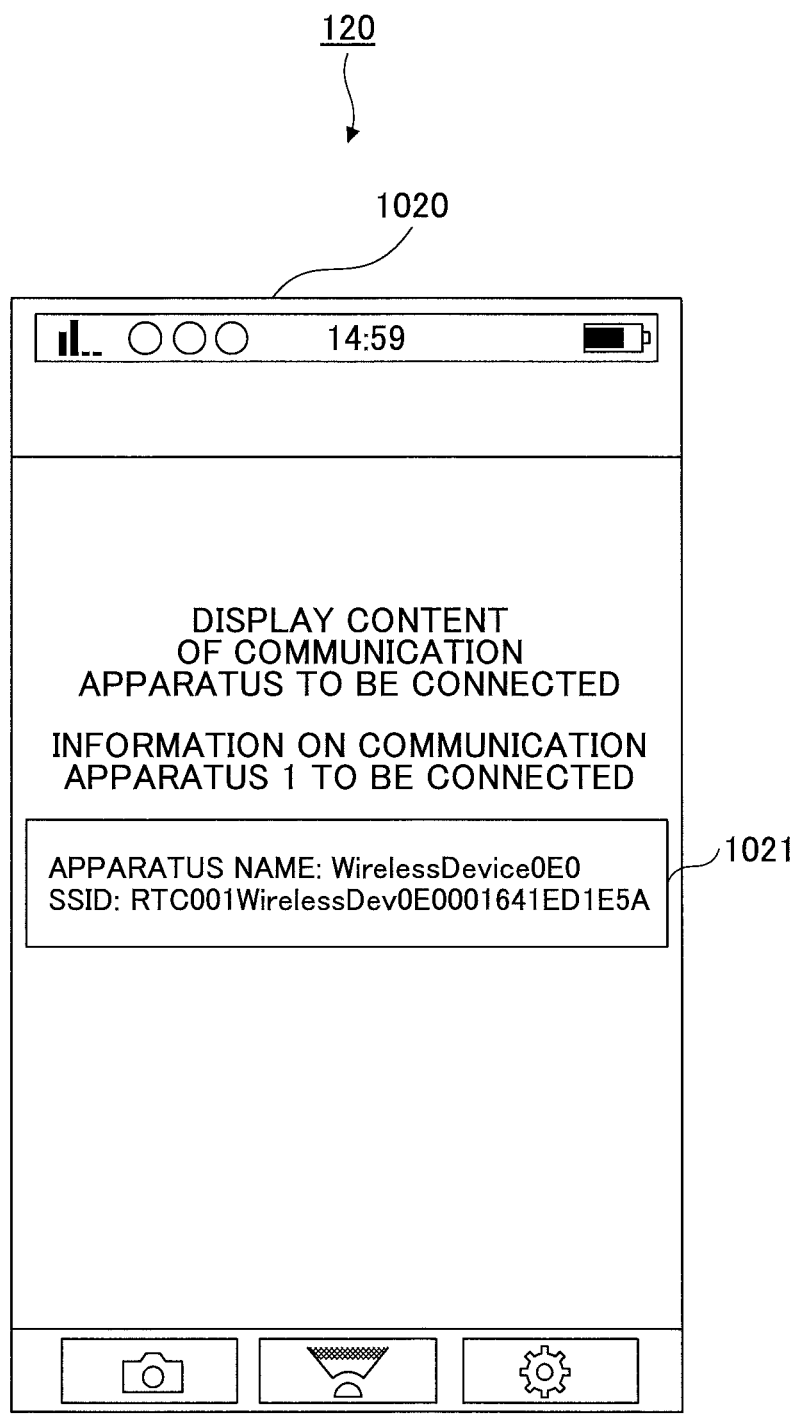

FIG. 10C is a diagram illustrating one example of a display screen 1020 which is displayed on the output unit 326 of the information terminal 120. As shown in FIG. 100, on the display screen 1020, an apparatus name and an SSID are displayed as information 1101 on the connection destination with which a wireless connection is made.

When the information on the connection destination is explicitly indicated and the wireless connection is completed, the communication process is executed. More specifically, the user inputs an instruction necessary for producing reproduction content data to be reproduced in the display apparatus 110, or inputs an instruction necessary for producing reproduction control information. Moreover, when production of the reproduction content data and production of the reproduction control information are completed, an instruction is input for transmitting the reproduction content data and the reproduction control information to the display apparatus 110 (step S911).

Based on the instruction, the information terminal 120 produces the reproduction content data and the reproduction control information and transmits the produced reproduction content data and reproduction control information to the display apparatus A (110) (step S912). This makes it possible to reproduce reproduction content data based on reproduction control information in the display apparatus A (110).

summary

As evident from the above explanations, according to the present embodiment, a display apparatus, which is a communication apparatus on the connection destination side, is configured as follows:

An SSID is produced such that a scheme identifier is described at a predetermined location; and A beacon is transmitted with the SSID included in the beacon.

Moreover, in the present embodiment, an information terminal, which is a communication apparatus on the connection source side, is configured as follows:

for an SSID included in the respective beacons received, it is determined whether a scheme identifier is described in a predetermined position;

if it is described therein, it is determined that a communication apparatus corresponding to the SSID is a communication apparatus which can be wirelessly connected to. Moreover, if it is not described therein, it is determined that the communication apparatus corresponding to the SSID is not the communication apparatus which can be wirelessly connected to;

if the user selects a predetermined SSID from SSIDs included in the respective beacons received, when the communication apparatus corresponding to the specified SSID is a communication apparatus which can be wirelessly connected to, it is set as a network to be connected to. Moreover, when it is not the communication apparatus which can be wirelessly connected to, an alarm is output; and in outputting the alarm, it is explicitly indicated that the communication apparatus corresponding to the selected SSID is not a communication apparatus which can be wirelessly connected to.

In this way, even if the apparatus which cannot be wirelessly connected to is erroneously selected by the user, the information terminal, which is the communication apparatus on the connection source side, may immediately determine that the selection operation of the user is erroneous based on the scheme identifier included in the SSID. Moreover, based on the error message, the user himself may also immediately recognize that there is an error in the selection operation. In other words, for the user, when an erroneous selection operation is conducted, an alarm may be received at a timing at which the selection operation is conducted.

Therefore, a situation may be avoided such that the user waits for a response from a connection destination for a certain period in seeking to wirelessly connect to an erroneous connection destination, for example. Moreover, in a configuration in which the connection destination is selected for the connection program (the connection source side) 121 to obtain the SSID from the OS (Operating System) for the first time, such an advantage becomes more prominent.

As described above, the present embodiment makes it possible to speedily make a wireless connection.

Second Embodiment

While a process is described in which the user making an error in the SSID selection operation in connection operations and selecting a communication apparatus which cannot be wirelessly connected to, the present invention is not limited thereto. For example, the same also holds for a process (a setting information determination process) in which the user making an error in the setting information input operation in connection operations and inputting setting information which does not allow wireless communication.

Here, in the setting tables held in the wireless setting holding unit 422, there is also included a setting table in which only the range of the setting information is specified, a setting table for which inputting of setting information by the user is required is also included.

When the SSID in which is included the table identifier corresponding to such a setting table is selected by the user, inputting of the setting information is prompted to the user in the information terminal 120.

Here, it is assumed that there was an error in setting information input manually by the user (For example, it is assumed that setting information is input which exceeds a setting information range specified in the setting table.) In this case, in the present embodiment, the information terminal 120 executes the setting information determination process to identify it, immediately outputs an alarm to the user, and displays an error message. Below, details of the setting information determining process are described. The setting information determination process is executed between steps S906 and S907 in FIG. 9, for example.

Flow of Setting Information Determination Process

Figure 11:
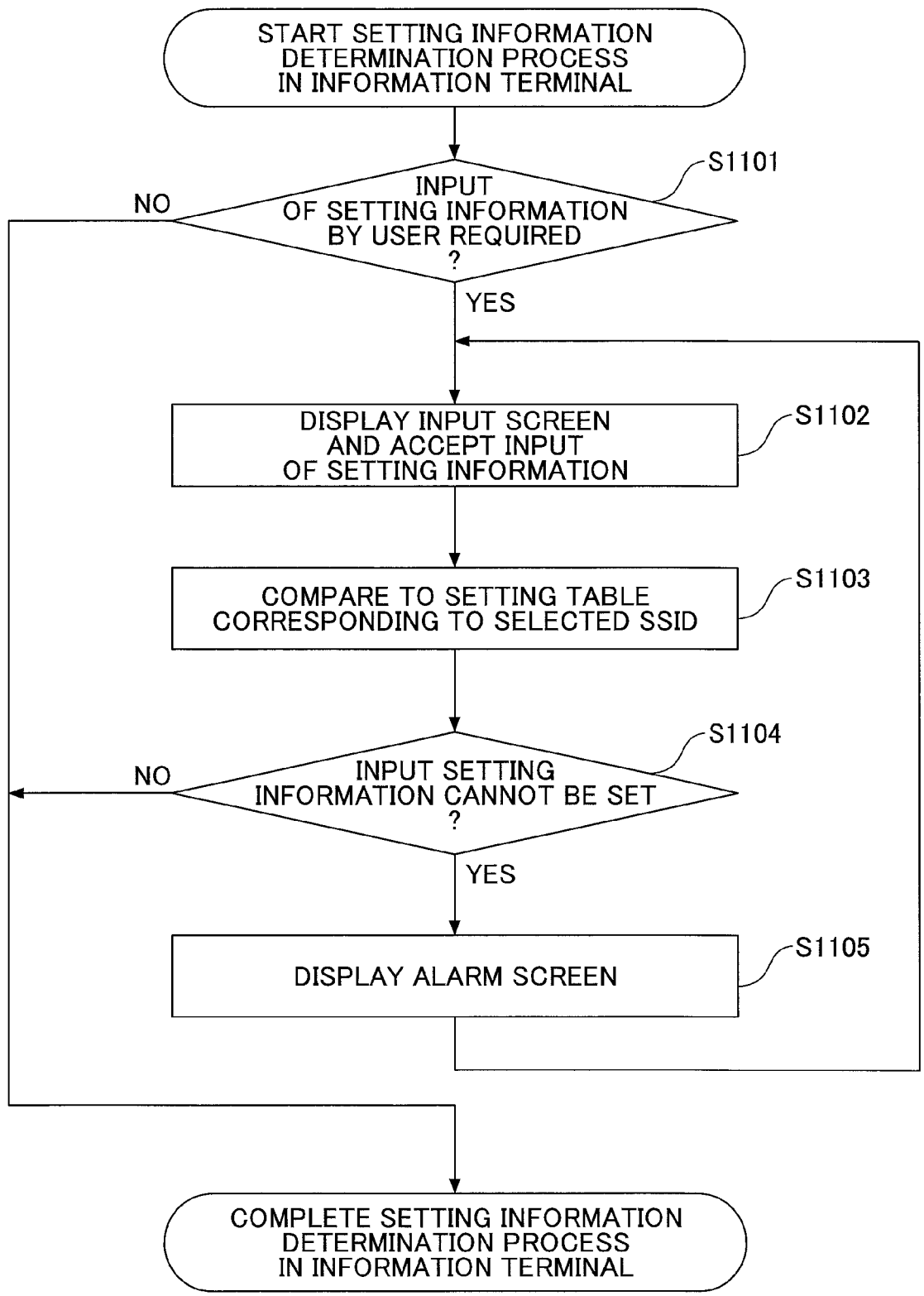
FIG. 11 is a flowchart illustrating a flow of a setting information determination process.

Using FIGS. 11 and 12A-12D, a flow of the setting information determination process is described. FIG. 11 is a diagram showing a flow of the setting information determination process in the information terminal 120. FIG. 12 is a diagram showing one example of a display screen displayed in the information terminal 120 in the connection process including the setting information determination process.

Figure 12B:
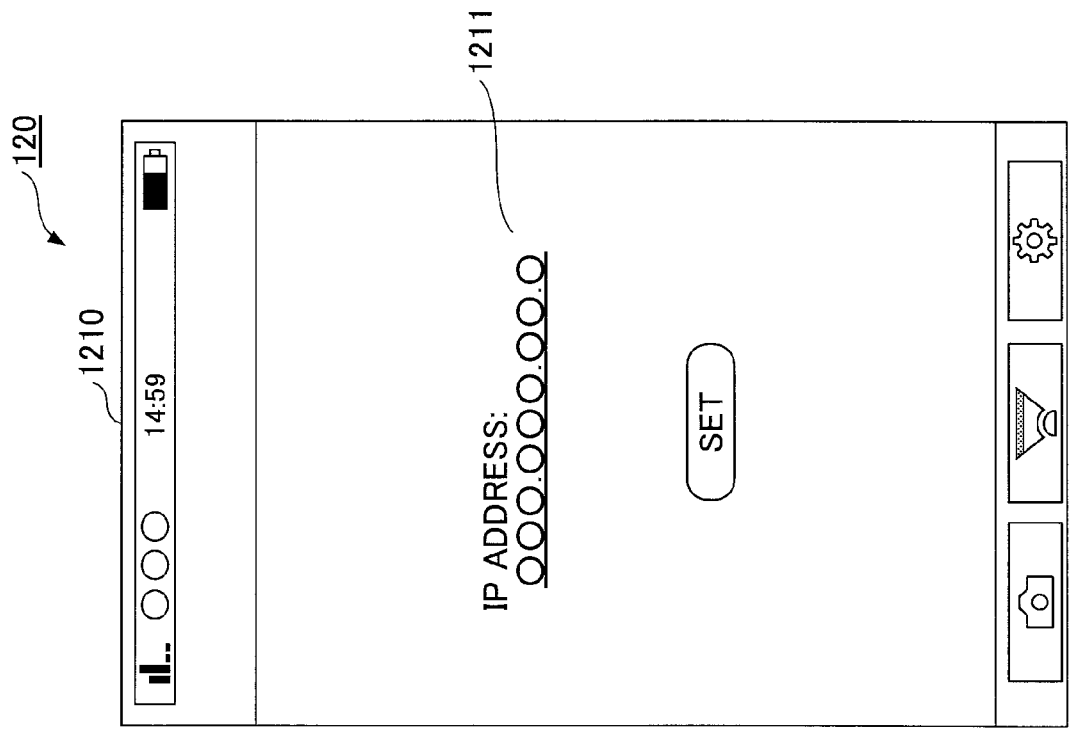
Figure 12A:
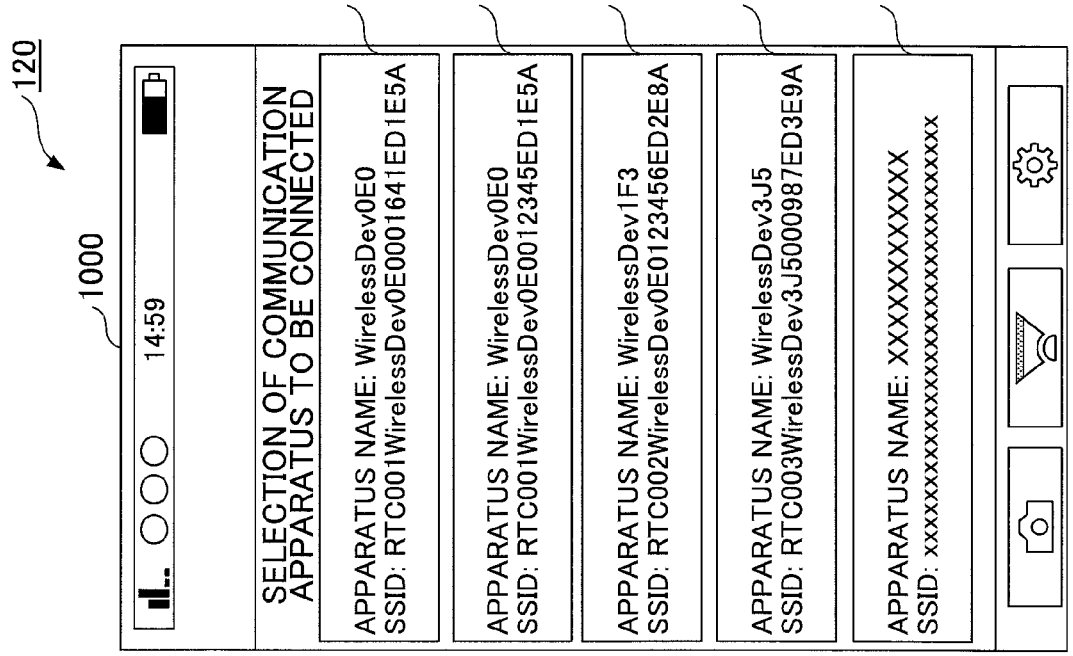

It is assumed that the user specifies the area 1001 and selects, as a network to be connected, the SSIC (C) displayed in the area 1004 while the selection screen 1000 shown in FIG. 12A is being displayed.

Here, if it is determined that the apparatus corresponding to the SSID (C) is an apparatus which can be wirelessly connected to (step S906), the setting information determination process shown in FIG. 11 is started.

In step S1101, it is determined whether the setting table specified by the table identifier (003) included in the selected SSID (SSID (C)) is a setting table for which inputting of setting information by the user is required.

In step S1101, if it is determined not to be the setting table for which inputting of the setting information by the user is required, the setting information determination process is completed, proceeding to steps S907, S908, and S909 in FIG. 9.

On the other hand, if it is determined to be the setting table for which inputting of the setting information by the user is required, the process proceeds to step S1102, where an input screen is displayed to prompt inputting of setting information and inputting of setting information from the user is accepted.

FIG. 12B is a diagram showing one example of the input screen 1210; setting information is input in an input column 1211 (In the example in FIG. 12B, an IP address is input.)

In step S1103, setting information input by the user in the input screen 1210 is compared with the range of setting information specified in the setting table (003) are compared and it is determined whether the setting is possible.

When it is determined, as a result of comparison in step S1103, that setting information input by the user is not within the range of setting information specified in the setting table (cannot be set), the process proceeds from step S1104 to S1105. In step S1105, an alarm screen is displayed to explicitly indicate, to the user, that wireless communication is not possible unless the setting information input is changed; and the range of the setting information.

FIG. 12C shows an example of an alarm screen 1220 displayed in step S1105.

In this way, even when the user erroneously inputs setting information not within the range of setting information, the information terminal 120 makes it possible to immediately determine that the user made an erroneous input operation based on the setting table. Moreover, based on the error message, the user himself may also immediately recognize that there is an error in the input operation. As a result, a situation may be avoided in which, in seeking to conduct wireless communication under erroneous setting information, the user waits for a response from the connection destination for a certain period.

Moreover, as the error message explicitly indicates that there was an error in the input operation and how to make modifications, making it possible for the user to easily recognize a cause of an error of an input operation.

On the other hand, when it is determined, as a result of comparison in step S1103, that setting information input by the user is within the range of setting information specified in the setting table (can be set), the setting information determination process is completed via step S1104. In this case, the process proceeds to steps S907, S908, and S909, where the display screen 1020 shown in FIG. 12D is displayed.

Summary

As evident from the above-described explanations, in the present embodiment:

when a part of setting information used in wireless communication and stored in a setting table is input by a user, it is determined, based on the setting table, whether there is an error in an input operation;

if there is an error as a result of the determination, an error message is displayed; and in displaying the error message, a cause of the error is explicitly indicated, and the range of setting information for which input is possible is explicitly indicated.

In this way, if there is an error in the input operation of the setting information, the error message may be immediately displayed to the user to allow the user to immediately recognize that there is an error in the input operation. As a result, a situation may be avoided in which, in seeking to conduct wireless communication under erroneous setting information, the user waits for a response from the connection destination for a certain period.

In other words, the present embodiment makes it possible to speedily make a wireless connection between communication apparatuses.

Other Embodiments

While the above-mentioned respective embodiments are configured to describe a scheme identifier in bytes 0-2; a table identifier in bytes 3-5; and an individual identifier in bytes 20-31 in producing the SSID, the present invention is not limited thereto. The positions at which the scheme identifier, the table identifier, and the individual identifier are described may be arbitrary positions as long as they are predetermined between the connection program (the connection destination side) 111 and the connection program (the connection source side) 121.

While an error message is displayed as an alarm output in the above-described respective embodiments, the present invention is not limited thereto. For example, an alarm may be output by a different display mode, such as displaying an identifier which indicates an alarm. Moreover, the alarm output is not limited to displaying, so that it may be other output modes such as voice, light, vibration, etc.

While a reproduction system is referred to in the respective embodiments as one example of a communication system according to the present invention, the present invention is not limited thereto. It may be any system as long as it is a system which wirelessly connects electronic apparatuses via a network and conducts transmission/reception of data.

For example, while equipment units such as a projector 211, a display, etc., are exemplified in the respective embodiments as electronic equipment which make up a communication system 100, the present invention is not limited thereto. FIGS. 13A-13C are diagrams illustrating one example of a system configuration when a communication system 100 is configured using various electronic apparatuses.

As shown in FIGS. 13A and 13B, a communication system 100 may be configured using an electronic apparatus such as a teleconferencing system 1301, an electronic whiteboard 1302, etc. Alternatively, as shown in FIG. 13C, the communication system 100 may be configured using an electronic apparatus having a printing function, such as an MFP (multifunction peripheral) 1303, a printer (not shown), etc. For an electronic apparatus having a printing function such as an MFP 1303, a printer, etc., the information terminal 120 may be configured to transmit printing data instead of reproduction content data.

While the present invention has been described in the above based on the respective embodiments, the present invention is not limited to requirements shown in the above-described embodiments. These points may be changed within the scope of embodiments without compromising the gist of the present invention and may be appropriately determined in accordance with the application thereof.

The present application is based on and claims the benefit of priority of Japanese Priority Application No. 2013-187001 filed on Sep. 10, 2013 and Japanese Priority Application No. 2014-114310 filed on Jun. 2, 2014, the entire contents of which are hereby incorporated by reference.

The invention claimed is:

1. A communication system having a first communication apparatus and a second communication apparatus, wherein the first communication apparatus includes a transmission unit which transmits a signal including at least a network identifier, and wherein the second communication apparatus includes a display which displays a screen for selecting one of a plurality of network identifiers included in a plurality of signals received, respectively;

and a control unit configured to connect to a network of the network identifier selected via the screen when predetermined information is included in a predetermined location in the network identifier selected and which outputs an alarm when the predetermined information is not included in the predetermined location in the network identifier selected, wherein when the predetermined information is included in the predetermined location in the network identifier, a setting table in which is stored setting information used in wireless communication with first communication apparatus is read based on table identifier information for identifying the setting table included in the network identifier selected, and the setting information of the setting table is set within the second communication apparatus.

2. The communication system as claimed in claim 1, wherein the first communication apparatus is a projector.

3. The communication system as claimed in claim 1, wherein the control unit is further configured to select one of the plurality of displayed network identifiers via a user input device.

4. A non-transitory storage medium having stored thereon a connection program which causes a computer of a source communication apparatus to execute:
   a procedure of selecting one of a plurality of network identifiers displayed on a display screen of a display apparatus, the plurality of network identifiers being included in a plurality of signals received; and
   a procedure of connecting to a network of the network identifier selected when predetermined information is included in a predetermined location in the network identifier selected and which outputs an alarm when the predetermined information is not included in the predetermined location in the network identifier selected,
   wherein, in the procedure of connecting,
      when the predetermined information is included in the predetermined location, a setting table in which is stored setting information used in wireless communication with a destination communication apparatus is read based on table identifier information for identifying the setting table included in the network identifier selected, and setting information of the setting table is set within the source communication apparatus.

5. The non-transitory storage medium as claimed in claim 4, wherein
   when the predetermined information is not included therein, the procedure of connecting carries out an alarm which prompts a selection of another network identifier.

6. The non-transitory storage medium as claimed in claim 4 wherein, when the predetermined information is included therein, the procedure of connecting determines, when an input of the setting information is made by a user, whether it is possible to set the input setting information based on the setting table, and, if it is determined that it is not possible to set the input setting information, outputs the alarm.

7. The non-transitory storage medium as claimed in claim 6, wherein
   the procedure of connecting carries out the alarm which prompts changing the setting information which is determined not possible to be set.

8. The non-transitory storage medium as claimed in claim 4 wherein the setting table stores therein setting information of at least any one of a communication mode, an authentication scheme, an encryption scheme, a frequency channel, a transmission standard, a communication protocol, and an IP address.

9. A communication method of a communication apparatus, comprising the steps of:
   selecting a network identifier displayed on a display screen of a display apparatus, the network identifier being included in a signal received; and
   connecting to a network, via a display screen of the communication apparatus, of the network identifier selected when predetermined information is included in a predetermined location in the network identifier selected and which outputs an alarm when the predetermined information is not included in the predetermined location in the network identifier selected, wherein when the predetermined information is included the the predetermined location in the network identifier, a setting table in which is stored setting information used in wireless communication with first communication apparatus is read based on table identifier information for identifying the setting table included in the network identifier selected, and the setting information of the setting table is set within the second communication apparatus.

* * * * *